(12) United States Patent
Chen et al.

(10) Patent No.: US 9,883,497 B2
(45) Date of Patent: Jan. 30, 2018

(54) CONTROL SIGNALING TRANSMISSION AND DETECTION METHODS, BASE STATION, AND TERMINAL

(71) Applicant: ZTE CORPORATION, Shenzhen, Guangdong Province (CN)

(72) Inventors: Yijian Chen, Shenzhen (CN); Bo Dai, Shenzhen (CN); Zhisong Zuo, Shenzhen (CN); Jun Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 50 days.

(21) Appl. No.: 14/386,881

(22) PCT Filed: Aug. 2, 2013

(86) PCT No.: PCT/CN2013/000910
§ 371 (c)(1),
(2) Date: Sep. 22, 2014

(87) PCT Pub. No.: WO2014/019343
PCT Pub. Date: Feb. 6, 2014

(65) Prior Publication Data
US 2015/0304991 A1 Oct. 22, 2015

(30) Foreign Application Priority Data
Aug. 3, 2012 (CN) .......................... 2012 1 0275429

(51) Int. Cl.
*H04W 72/04* (2009.01)
*H04L 5/22* (2006.01)
(Continued)

(52) U.S. Cl.
CPC ......... *H04W 72/042* (2013.01); *H04L 5/0048* (2013.01); *H04L 5/0053* (2013.01);
(Continued)

(58) Field of Classification Search
CPC .................................................. H04W 72/042
See application file for complete search history.

(56) References Cited

U.S. PATENT DOCUMENTS

2012/0282936 A1* 11/2012 Gao ...................... H04L 5/0023
455/450
2012/0320846 A1* 12/2012 Papasakellariou .. H04W 72/042
370/329

(Continued)

FOREIGN PATENT DOCUMENTS

| CN | 102164416 A | 8/2011 |
|---|---|---|
| CN | 102170703 A | 8/2011 |

(Continued)

OTHER PUBLICATIONS

Discussion on eREG/eCC definition; LG Electronics; 3GPP TSG RAN WG1 Meeting #69; Prague, Czech Republic, May 21-25, 2012. R1-122308.

(Continued)

*Primary Examiner* — Jason Mattis
(74) *Attorney, Agent, or Firm* — Ling Wu; Stephen Yang; Ling and Yang Intellectual Property

(57) ABSTRACT

A control signaling transmission method, a control signaling detection method, a terminal, and a base station are provided. The transmission method includes: a base station determining an enhanced Physical Downlink Control Channel (ePDCCH) resource region of the terminal in a current subframe according to at least one of multiple parameters, and transmitting control signaling to the terminal on some or all of the resources in the ePDCCH resource region. The above technical scheme can adapt to the dynamically-changing transmission capabilities of subframes, improves the transmission performance of the control signaling on an ePDCCH, increases the accuracy of the terminal in search- (Continued)

ing for the control signaling, and conserves terminal consumption. Therefore, the present document has a great industrial applicability.

20 Claims, 6 Drawing Sheets

(51) Int. Cl.
| | |
|---|---|
| *H04L 27/26* | (2006.01) |
| *H04W 56/00* | (2009.01) |
| *H04W 72/00* | (2009.01) |
| *H04W 72/14* | (2009.01) |
| *H04L 5/00* | (2006.01) |
| *H04L 5/14* | (2006.01) |

(52) U.S. Cl.
CPC ............... *H04L 5/22* (2013.01); *H04L 27/26* (2013.01); *H04W 56/001* (2013.01); *H04W 72/005* (2013.01); *H04W 72/14* (2013.01); H04L 5/0023 (2013.01); H04L 5/1469 (2013.01)

(56) References Cited

U.S. PATENT DOCUMENTS

| | | | | |
|---|---|---|---|---|
| 2013/0039284 A1* | 2/2013 | Marinier | ................ | H04L 5/001 370/329 |
| 2013/0301562 A1* | 11/2013 | Liao | .................... | H04W 72/042 370/329 |
| 2014/0016596 A1* | 1/2014 | Kim | ....................... | H04L 5/001 370/329 |
| 2014/0036810 A1* | 2/2014 | Harrison | ............. | H04W 72/042 370/329 |
| 2015/0036560 A1* | 2/2015 | Kim | .................. | H04W 72/0406 370/280 |

FOREIGN PATENT DOCUMENTS

| | | |
|---|---|---|
| CN | 102186251 A | 9/2011 |
| CN | 102256358 A | 11/2011 |
| CN | 102315870 A | 1/2012 |
| CN | 102355732 A | 2/2012 |
| CN | 102368759 A | 3/2012 |
| CN | 102378366 A | 3/2012 |
| CN | 102395206 A | 3/2012 |
| CN | 102404076 A | 4/2012 |
| CN | 102420685 A | 4/2012 |
| CN | 102611524 A | 7/2012 |
| WO | 2010082877 A1 | 7/2010 |
| WO | 2011085192 A1 | 7/2011 |
| WO | 2011122780 A2 | 10/2011 |
| WO | WO2011126212 A2 | 10/2011 |

OTHER PUBLICATIONS ePDCCH search space design; NEC Group; 3GPP TSG RAN WG1 Meeting #69; Prague, Czech Republic, May 21-25, 2012. R1-122595.
Search Space Design for ePDCCH Transmission Schemes; NTT DOCOMO; 3GPP TSG RAN WG1 Meeting #69, Prague, Czech Republic, May 21-25, 2012. R1-122899.
LG Electronics, Discussion on PUCCH Resource for ePdcch, 3GPP TSG RAN WG1 Meeting#69 R1-122314,May 21-25, 2012, the whole document.

* cited by examiner

CONTROL SIGNALING TRANSMISSION AND DETECTION METHODS, BASE STATION, AND TERMINAL

TECHNICAL FIELD

The present document relates to downlink control information transmission and detection technologies on an enhanced control channel, and in particular, to downlink control information transmission and detection methods and apparatuses and a terminal on an enhanced control channel in a wireless communication system.

BACKGROUND OF THE RELATED ART

In a Long Term Evolution (LTE) system and an LTE-Advance system, downlink physical layer control signaling includes downlink transmission related Downlink Grant (DL Grant) information needed to be acquired by a terminal and uplink transmission related Uplink Grant (UL Grant) information needed to be acquired by a UE to indicate various transmission related information such as positions of transmission resources, modulation and encoding modes etc. These physical layer control signaling is transmitted on a Physical Downlink Control channel (PDCCH). The physical layer control signaling here primarily refers to user dedicated control signaling of the physical layer.

In Release (R for short) 8/9 of the LTE system and R10 of the LTE-Advance system, the physical layer control channel for transmitting the physical layer control signaling is generally configured to be transmitted on first N Orthogonal Frequency Division Multiplexing (OFDM) symbols, and the N symbols are generally referred to as a control signaling transmission region.

Available transmission resources of the existing control signaling transmission region (first control signaling transmission region, or first control signaling region) are divided into multiple resource units of Control Channel Elements (CCEs), control information occupation resources are allocated with units being CCEs, and the resource units of CCEs here can further be subdivided into multiple REGs, and one CCE is comprised of multiple discontinuous Resource Element Groups (REGs). In general, 9 REGs constitute one CCE, and further, each REG is comprised of multiple basic resource units.

Dedicated control signaling and common control signaling are transmitted with resource units being CCEs, then are mapped onto corresponding REG resources, and are further mapped onto minimum Resource Elements (REs) of multiple Physical Resource Blocks (PRBs). The terminal generally performs blind detection by means of: calculating initial positions of dedicated control signaling and common control signaling. Here, the dedicated control signaling is primarily concerned:

TABLE ONE

Aggregation levels of blind detection of control signaling and the number of blind detections

| | Blind detection space $S_k$ [L] | | |
|---|---|---|---|
| Type of control signaling | Aggregation level L | Size of blind detection space [in CCEs] | Number of blind detections M [L] |
| UE-dedicated | 1 | 6 | 6 (6/1) |
| | 2 | 12 | 6 (12/2) |

TABLE ONE-continued

Aggregation levels of blind detection of control signaling and the number of blind detections

| | Blind detection space $S_k$ [L] | | |
|---|---|---|---|
| Type of control signaling | Aggregation level L | Size of blind detection space [in CCEs] | Number of blind detections M [L] |
| | 4 | 8 | 2 (8/4) |
| | 8 | 16 | 2 (16/8) |
| common | 4 | 16 | 4 (16/4) |
| | 8 | 16 | 2 (16/8) |

It can be seen that control signaling transmission resources allocated by a user are discontinuous, which brings many difficulties to implementation of a closed-loop precoding technology in a multi-antenna system. Therefore, in the control signaling region, only the diversity technology can be used, and it is difficult to use the closed-loop precoding technology. The primary reason is that there are great difficulties in demodulation pilot design and channel state information feedback of the first control signaling region, and therefore the control signaling in the existing releases only supports discontinuous resource transmission and diversity technologies.

In releases after R10, in order to enhance a transmission capacity of the control channel and support control signaling of more users, it is considered in design to develop a new control channel region (a second control signaling transmission region, or a second control signaling region), and the control signaling transmission resources of the same UE may be continuous time-frequency resources, to support the closed-loop precoding technology, thereby enhancing the transmission performance of the control information.

The control signaling regions of new and old releases are shown in FIG. 1. This method allocates part of transmission resources in the Physical Downlink Shared Channel (PDSCH) transmission region of the original R8/9/10 to be used as a new control signaling transmission region, so that the closed-loop precoding technology is supported when the control signaling is transmitted, thereby enhancing the control signaling capacity and supporting control signaling of more users. The control channel transmitted in the second control signaling region may be referred to as a second control channel or an enhanced PDCCH (ePDCCH).

Some ePDCCH detection methods will be described in terms of detection of resource granularity, pilot ports of candidate positions of ePDCCH transmission (ePDCCH candidates), transmission modes etc.

In general, without additional information, the terminal is not notified of how many transmission resources will be occupied by the encoded and modulated control information, the base station will firstly notifies the terminal of an ePDCCH resource Region such as 4 PRB pairs, for example, FIG. 1 illustrates 4 of all PRB pairs of the whole bandwidth, or the transmission resources are determined by the terminal according to a UE ID or other UE specific parameters. The ePDCCH resource Region actually limits that control information transmitted on all ePDCCHs of the terminal can only be included in the Region. Of course, the control information will not necessarily occupy the Region completely.

The base station and the terminal can also appoint that a basic resource allocation unit is the minimum allocation granularity, and then further appoint sizes of several occupation resources, which are generally aggregations of one or more resource allocation units. Aggregation of N resource allocation units is referred to as aggregation level N. The base station can transmit the encoded and modulated control information in one of the sizes. The terminal will perform blind detection on the several further appointed resource sizes, which can also be referred to as detecting several appointed aggregation levels. In general, a basic resource unit eCCE is defined, which has similar functions as that of the previous CCEs. The eCCE in the second control region may use the definition of the CCE in the old releases or be defined by slightly amending the definition of the CCE in the old releases, or may also be newly defined, or may has a fixed size or a variable size.

The eCCEs may include Distributed eCCEs and Localized eCCEs, as shown in FIG. 2.

Then, the control signaling may define different aggregation levels based on the eCCE, for example, aggregation 1, 2, 4, 8, or 1, 2, 4, or 1, 3, 5, 7 etc. Then different aggregation levels represent different resource sizes. The terminal specifically performs the blind detection on the several aggregation levels The UE performs detection on these candidates. Blind detection will be performed on the candidates one by one. In consideration of the complexity, the terminal can not detect all possible conditions, and therefore, there is a search space including some specified candidates under multiple aggregation levels. As shown in FIG. 3, one grid represents one L-eCCE, which is comprised of 2 eREGs. As shown in FIG. 4, one grid represents one eREG.

In the prior art, the EPDCCH resource Region has a fixed size, for example, N PRBs, or M eCCEs etc. However, in an actual system, there are some conditions which will make the REs of the eCCEs available for carrying control information become less, for example:

for a common subframe and a special subframe of a TDD system, numbers of available OFDM symbols are different, and REs of each eCCE available for carrying control information are different.

Numbers of OFDM symbols occupied by the PDCCH are different, and REs of each eCCE available for carrying control information are different.

For the MBSFN subframe and the non-MBSFN subframe, as CRSs of 24 REs are to be transmitted, the REs available for carrying control information are different.

For subframes with a CSI-RS pilot and without a CSI-RS pilot, the REs available for carrying control information are different.

In some cases, REs in the eCCE available for carrying control information will be less; while in some cases, REs available for carrying control information will be more. When the REs available for carrying control information is less, the EPDCCH resource Region is generally large, and the frequency domain diversity gain or the frequency domain selectivity scheduling gain will be fully developed after a larger number of detections; and when the REs available for carrying control information is more, the EPDCCH resource Region needs not to be too large. While in the related art, the EPDCCH resource Region has a fixed size, which will influence the performance.

SUMMARY OF THE INVENTION

The technical problem to the solved by the embodiments of the present document is to provide control signaling transmission and detection methods, a base station and a terminal, to solve the problem determined in the related method that the consumption is excessive due to an over-large ePDCCH resource region.

In order to solve the above technical problem, the following technical schemes are used:

A control signaling transmission method, comprising:

a base station determining an enhanced Physical Downlink Control Channel (ePDCCH) resource region of a terminal in a current subframe according to at least one of the following parameters, and transmitting control signaling to the terminal on some or all of the resources in the ePDCCH resource region:

a number of Resource Elements (REs) available for carrying control information in a resource block or an enhanced Control Channel Element (eCCE) or an enhanced Resource Element Group (eREG) in the current subframe;

aggregation level configuration needed to be detected by the terminal;

a type of an ePDCCH transmission mode for transmitting the control signaling to the terminal, comprising: a single beamforming transmission mode, i.e., a single-layer transmission technology using one demodulation reference signal port, a spatial diversity transmission mode, a centralized transmission mode, an a distributed transmission mode;

a subframe type of the current subframe;

a pilot transmission condition in the current subframe;

a synchronization signal transmission condition in the current subframe;

a Physical Broadcast Channel (PBCH) transmission condition in the current subframe; and a subframe number of the current subframe.

Alternatively, the step of a base station determining an ePDCCH resource region of a terminal in a current subframe according to at least one of the following parameters comprises:

the base station determining the ePDCCH resource region of the terminal in the current subframe according to at least two of the parameters.

Alternatively, at least two of the parameters comprise the subframe number of the current subframe.

Alternatively, the resource block is a physical resource block pair or a virtual resource block.

Alternatively, the subframe type of the current subframe at least comprises one of the following types:

a Time Division Multiplexing (TDD) special subframe type, a non-TDD special subframe type, a cyclic prefix type, a multicast broadcast single frequency network subframe type, a non-multicast broadcast single frequency network subframe type.

Alternatively, the pilot transmission condition in the current subframe at least comprises one of the following conditions:

an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

Alternatively, the step of a base station determining an ePDCCH resource region of a terminal in a current subframe comprises:

the base station determining a set of ePDCCH resource regions from N sets of candidate ePDCCH resource regions, wherein N is an integer larger than 0.

Alternatively, the step of a base station determining an ePDCCH resource region of a terminal in a current subframe further comprises:

the base station notifying information of N sets of candidate ePDCCH resource regions to the terminal; or the base station determining the N sets of candidate ePDCCH resource regions according to an identity of the terminal; or the base station notifying information of M sets of candidate ePDCCH resource regions capable of determining the information of the N sets of candidate ePDCCH resource regions to the terminal, wherein M is an integer larger than 0.

Alternatively, there are overlapped resources in the N sets of candidate ePDCCH resource regions;

when N is 2, two sets of candidate ePDCCH resource regions are in a subset relationship; and when N is 3, an union set of a first set of candidate ePDCCH resource regions and a second set of candidate ePDCCH resource regions is the first set of candidate ePDCCH resource regions.

A base station, comprising an enhanced Physical Downlink Control Channel (ePDCCH) resource region determination module and a transmission module, wherein, the ePDCCH resource region determination module is configured to determine an ePDCCH resource region of a terminal in a current subframe according to at least one of the following parameters:

a number of Resource Elements (REs) available for carrying control information in a Resource Block (RB) or an enhanced Control Channel Element (eCCE) or an enhanced Resource Element Group (eREG) in the current subframe;

aggregation level configuration needed to be detected by the terminal;

a type of an ePDCCH transmission mode for transmitting the control signaling to the terminal, comprising: a single beamforming transmission mode, i.e., a single-layer transmission technology using one demodulation reference signal port, a spatial diversity transmission mode, a centralized transmission mode, an a distributed transmission mode;

a subframe type of the current subframe;

a pilot transmission condition in the current subframe;

a synchronization signal transmission condition in the current subframe;

a Physical Broadcast Channel (PBCH) transmission condition in the current subframe; and a subframe number of the current subframe; and the transmission module is configured to transmit control signaling to the terminal on some or all of the resources in the ePDCCH resource region.

Alternatively, the ePDCCH resource region determination module is configured to determine an ePDCCH resource region of a terminal in a current subframe by means of:

determining the ePDCCH resource region of the terminal in the current subframe according to at least two of the parameters.

Alternatively, at least two of the parameters comprise the subframe number of the current subframe.

Alternatively, the resource block is a physical resource block pair or a virtual resource block.

Alternatively, the subframe type of the current subframe at least comprises one of the following types:

a Time Division Multiplexing (TDD) special subframe type, a non-TDD special subframe type, a cyclic prefix type, a multicast broadcast single frequency network subframe type, a non-multicast broadcast single frequency network subframe type.

Alternatively, the pilot transmission condition in the current subframe at least comprises one of the following conditions:

an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

Alternatively, the ePDCCH resource region determination module is configured to determine an ePDCCH resource region of a terminal in a current subframe by means of:

determining a set of ePDCCH resource regions from N sets of candidate ePDCCH resource regions, wherein N is an integer larger than 0.

Alternatively, the transmission module is further configured to:

notify information of the N sets of candidate ePDCCH resource regions to the terminal; or notify information and criterion of M sets of candidate ePDCCH resource regions capable of determining the information of the N sets of candidate ePDCCH resource regions to the terminal, wherein M is an integer larger than 0.

Alternatively, the ePDCCH resource region determination module is configured to determine an ePDCCH resource region of a terminal in a current subframe by means of:

determining the N sets of candidate ePDCCH resource regions according to an identity of the terminal.

Alternatively, there are overlapped resources in the N sets of candidate ePDCCH resource regions;

when N is 2, two sets of candidate ePDCCH resource regions are in a subset relationship; and when N is 3, an union set of a first set of candidate ePDCCH resource regions and a second set of candidate ePDCCH resource regions is the first set of candidate ePDCCH resource regions.

A control signaling detection method, comprising:

a terminal determining an enhanced Physical Downlink Control Channel (ePDCCH) resource region of the terminal in a current subframe according to at least one of the following parameters, and detecting control signaling on some or all of the resources in the ePDCCH resource region:

a number of Resource Elements (REs) available for carrying control information in a Resource Block (RB) or an enhanced Control Channel Element (eCCE) or an enhanced Resource Element Group (eREG) in the current subframe;

aggregation level configuration needed to be detected by the terminal;

a type of an ePDCCH transmission mode for transmitting the control signaling to the terminal, comprising: a single beamforming transmission mode, i.e., a single-layer transmission technology using one demodulation reference signal port, a spatial diversity transmission mode, a centralized transmission mode, an a distributed transmission mode;

a subframe type of the current subframe;

a pilot transmission condition in the current subframe;

a synchronization signal transmission condition in the current subframe;

a Physical Broadcast Channel (PBCH) transmission condition in the current subframe; and a subframe number of the current subframe.

Alternatively, the step of a terminal determining an ePDCCH resource region of the terminal in a current subframe according to at least one of the following parameters comprises:

the terminal determining the ePDCCH resource region of the terminal in the current subframe according to at least two of the parameters.

Alternatively, at least two of the parameters comprise the subframe number of the current subframe.

Alternatively, the resource block is a physical resource block pair or a virtual resource block.

Alternatively, the subframe type of the current subframe at least comprises one of the following types:

a Time Division Multiplexing (TDD) special subframe type, a non-TDD special subframe type, a cyclic prefix type, a multicast broadcast single frequency network subframe type, a non-multicast broadcast single frequency network subframe type.

Alternatively, the pilot transmission condition in the current subframe at least comprises one of the following conditions:

an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

Alternatively, the step of a terminal determining an ePDCCH resource region of the terminal in a current subframe comprises:

determining a set of ePDCCH resource regions from N sets of candidate ePDCCH resource regions, wherein N is an integer larger than 0.

Alternatively, the step of a terminal determining an ePDCCH resource region of the terminal in a current subframe further comprises:

the terminal acquiring information of the N sets of candidate ePDCCH resource regions from the base station; or the terminal determining the N sets of candidate ePDCCH resource regions according to an identity of the terminal; or the terminal determining the information of the N sets of candidate ePDCCH resource regions according to information and criterion of M sets of candidate ePDCCH resource regions received from the base station, wherein M is an integer larger than 0.

Alternatively, there are overlapped resources in the N sets of candidate ePDCCH resource regions;

when N is 2, two sets of candidate ePDCCH resource regions are in a subset relationship; and when N is 3, an union set of a first set of candidate ePDCCH resource regions and a second set of candidate ePDCCH resource regions is the first set of candidate ePDCCH resource regions.

A terminal, comprising an enhanced Physical Downlink Control Channel (ePDCCH) resource region determination module and a detection module, wherein, the ePDCCH resource region determination module is configured to determine an ePDCCH resource region of the terminal in a current subframe according to at least one of the following parameters:

a number of Resource Elements (REs) available for carrying control information in a Resource Block (RB) or an enhanced Control Channel Element (eCCE) or an enhanced Resource Element Group (eREG) in the current subframe;

aggregation level configuration needed to be detected by the terminal;

a type of an ePDCCH transmission mode for transmitting the control signaling to the terminal, comprising: a single beamforming transmission mode, i.e., a single-layer transmission technology using one demodulation reference signal port, a spatial diversity transmission mode, a centralized transmission mode, an a distributed transmission mode;

a subframe type of the current subframe;

a pilot transmission condition in the current subframe;

a synchronization signal transmission condition in the current subframe;

a Physical Broadcast Channel (PBCH) transmission condition in the current subframe; and a subframe number of the current subframe; and the detection module is configured to detect control signaling on some or all of the resources in the ePDCCH resource region.

Alternatively, the ePDCCH resource region determination module is configured to determine an ePDCCH resource region of the terminal in a current subframe by means of:

determining the ePDCCH resource region of the terminal in the current subframe according to at least two of the parameters.

Alternatively, at least two of the parameters comprise the subframe number of the current subframe.

Alternatively, the resource block is a physical resource block pair or a virtual resource block.

Alternatively, the subframe type of the current subframe at least comprises one of the following types:

a Time Division Multiplexing (TDD) special subframe type, a non-TDD special subframe type, a cyclic prefix type, a multicast broadcast single frequency network subframe type, a non-multicast broadcast single frequency network subframe type.

Alternatively, the pilot transmission condition in the current subframe at least comprises one of the following conditions:

an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

Alternatively, the ePDCCH resource region determination module is configured to determine an ePDCCH resource region of the terminal in a current subframe by means of:

determining a set of ePDCCH resource regions from N sets of candidate ePDCCH resource regions, wherein N is an integer larger than 0.

Alternatively, the ePDCCH resource region determination module is configured to determine an ePDCCH resource region of the terminal in a current subframe by means of:

acquiring information of the N sets of candidate ePDCCH resource regions from the base station; or determining the N sets of candidate ePDCCH resource regions according to an identity of the terminal; or determining the information of the N sets of candidate ePDCCH resource regions according to information and criterion of M sets of candidate ePDCCH resource regions received from the base station, wherein M is an integer larger than 0.

Alternatively, there are overlapped resources in the N sets of candidate ePDCCH resource regions;

when N is 2, two sets of candidate ePDCCH resource regions are in a subset relationship; and when N is 3, an union set of a first set of candidate ePDCCH resource regions and a second set of candidate ePDCCH resource regions is the first set of candidate ePDCCH resource regions.

The above technical scheme can adapt to the dynamically-changing transmission capabilities of subframes, improves the transmission performance of the control signaling on an ePDCCH, increases the accuracy of the terminal in searching for the control signaling, and conserves terminal consumption.

BRIEF DESCRIPTION OF DRAWINGS

Figures 3, 4:
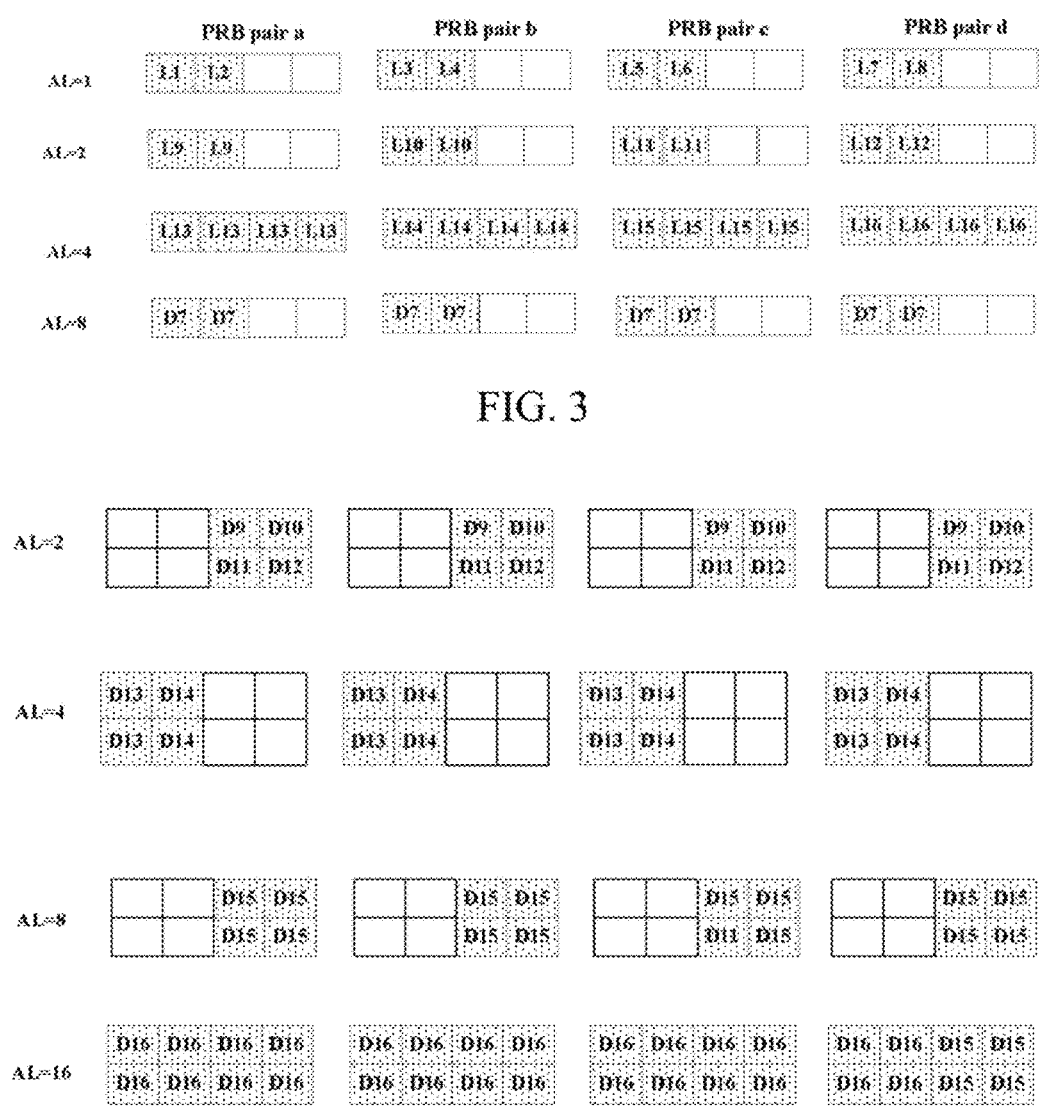

FIG. 3 is a diagram of a terminal searching for resources;

FIG. 4 is another diagram of a terminal searching for resources;

FIG. 7 is a diagram of aggregation levels and candidate regions in a search space when region 1 is selected in specific embodiments one and twenty;

FIG. 8 is a diagram of aggregation levels and candidate regions in a search space when region 2 is selected in specific embodiments two and twenty-one;

FIG. 9 is a diagram of aggregation levels and candidate regions in a search space when region 1 is selected in specific embodiments two and twenty-one;

FIG. 10 is a diagram of aggregation levels and candidate regions in a search space when region 2 is selected in specific embodiments three and twenty-two;

FIG. 11 is a diagram of aggregation levels and candidate regions in a search space when region 3 is selected in specific embodiments three and twenty-two; and FIG. 12 is a diagram of aggregation levels and candidate regions in a search space when region 1 is selected in specific embodiments three and twenty-two.

PREFERRED EMBODIMENTS OF THE INVENTION

Figure 1:
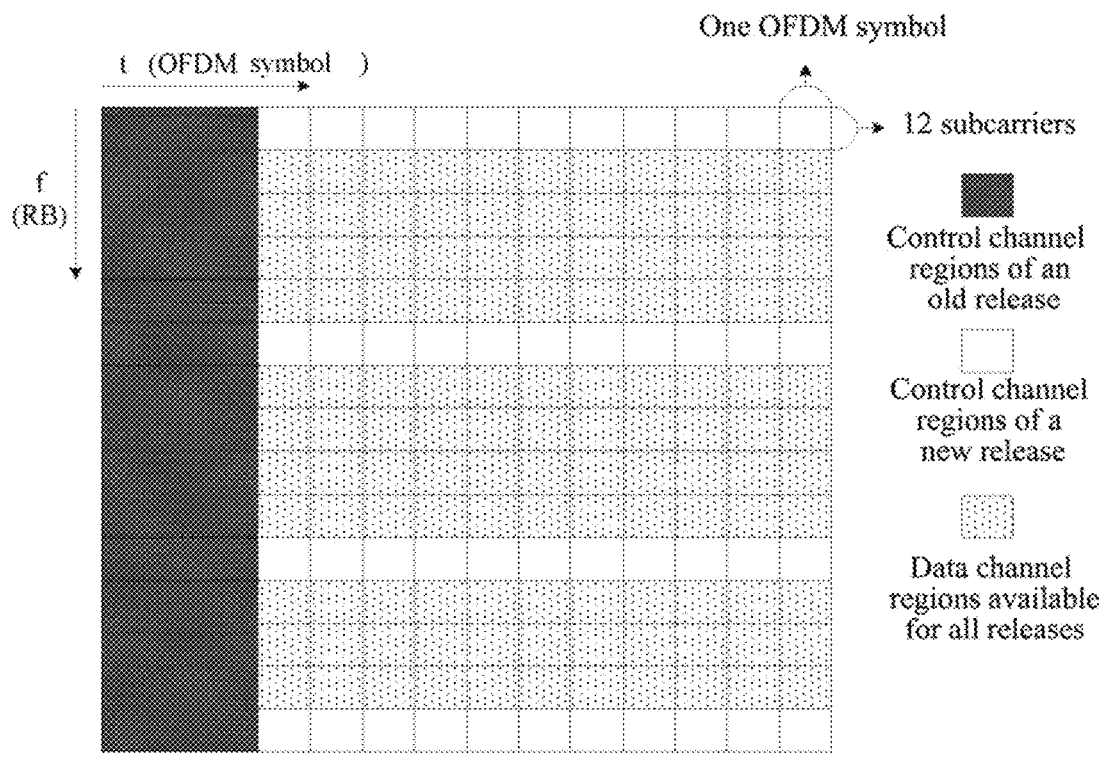
FIG. 1 is a diagram of a layout of control signaling.
Figure 2:
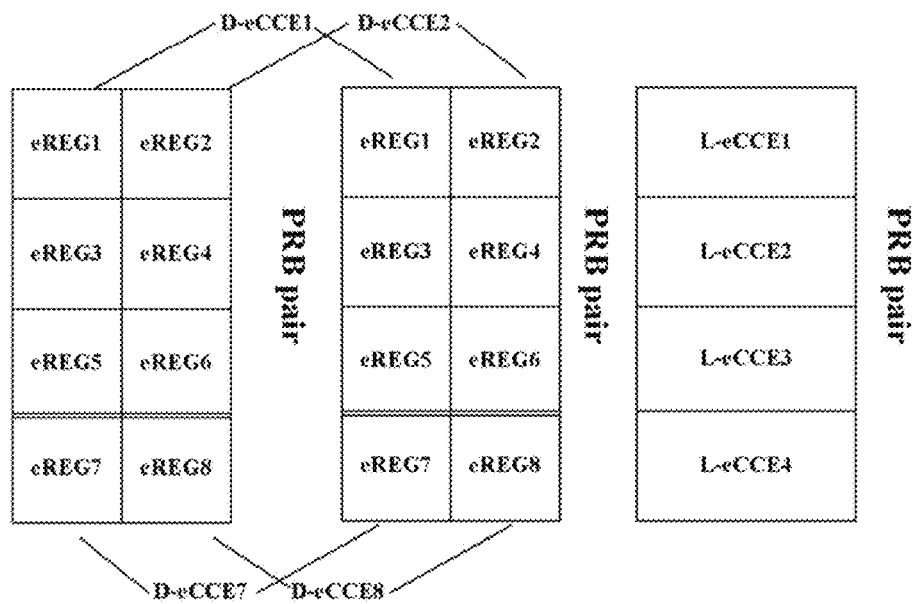
FIG. 2 is a diagram of constitution of an eCCE.
Figure 5:
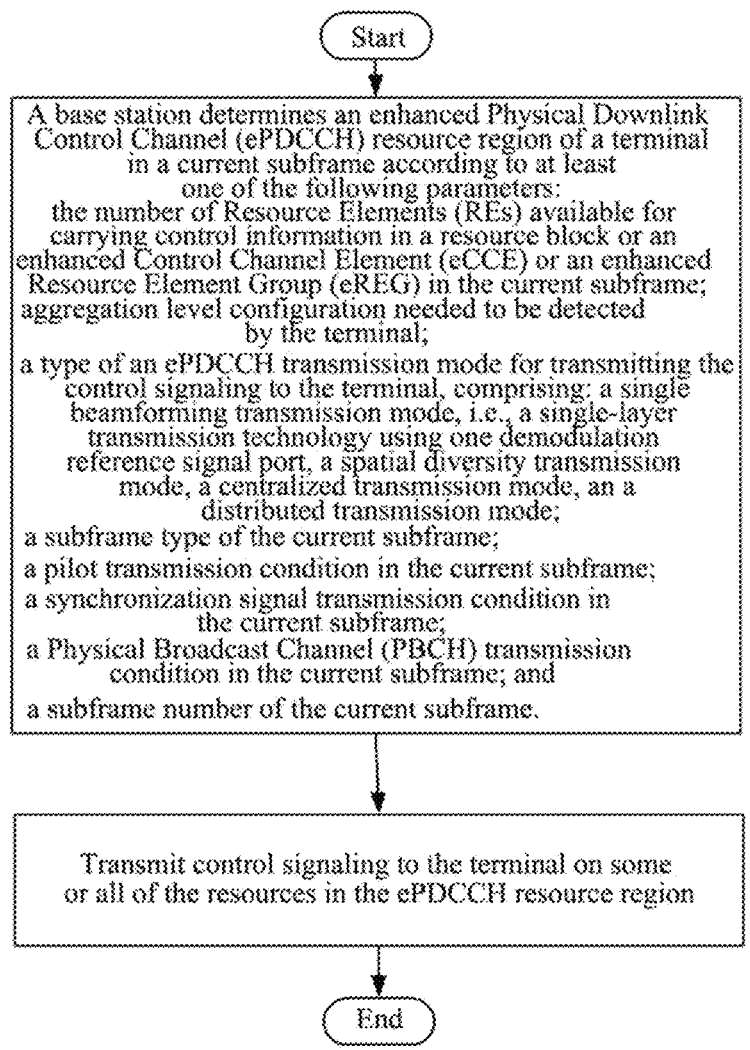
FIG. 5 is a diagram of a control signaling transmission method.

As shown in FIG. 5, a control signaling transmission method, comprises: a base station determining an enhanced Physical Downlink Control Channel (ePDCCH) resource region of a terminal in a current subframe according to at least one of the following parameters, and transmitting control signaling to the terminal on some or all of the resources in the ePDCCH resource region:

the number of Resource Elements (REs) available for carrying control information in a resource block or an enhanced Control Channel Element (eCCE) or an enhanced Resource Element Group (eREG) in the current subframe;

aggregation level configuration needed to be detected by the terminal;

a type of an ePDCCH transmission mode for transmitting the control signaling to the terminal, comprising: a single beamforming transmission mode, i.e., a single-layer transmission technology using one demodulation reference signal port, a spatial diversity transmission mode, a centralized transmission mode, an a distributed transmission mode;

a subframe type of the current subframe;

a pilot transmission condition in the current subframe;

a synchronization signal transmission condition in the current subframe;

a Physical Broadcast Channel (PBCH) transmission condition in the current subframe; and a subframe number of the current subframe.

The resource block is a physical resource block pair or a virtual resource block.

The base station determines the ePDCCH resource region of the terminal in the current subframe according to at least two of the parameters. At least two of the parameters comprise the subframe number of the current subframe.

The subframe type of the current subframe at least comprises one of the following types: a Time Division Multiplexing (TDD) special subframe type, a non-TDD special subframe type, a cyclic prefix type, a multicast broadcast single frequency network subframe type, a non-multicast broadcast single frequency network subframe type.

The pilot transmission condition in the current subframe at least comprises one of the following conditions: an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

A base station determining an ePDCCH resource region of a terminal in a current subframe comprises: determining a set of ePDCCH resource regions from N sets of candidate ePDCCH resource regions, wherein N is an integer larger than 0.

The base station notifying information of N sets of candidate ePDCCH resource regions to the terminal; or the base station determining the N sets of candidate ePDCCH resource regions according to an identity of the terminal; or the base station notifying information and criterion of M sets of candidate ePDCCH resource regions capable of determining the information of the N sets of candidate ePDCCH resource regions to the terminal, wherein M is an integer larger than 0.

There are overlapped resources in the N sets of candidate ePDCCH resource regions; when N is 2, two sets of candidate ePDCCH resource regions are in a subset relationship; and when N is 3, an union set of the first set of candidate ePDCCH resource regions and the second set of candidate ePDCCH resource regions is the first set of candidate ePDCCH resource regions.

A base station in the present scheme comprises an ePDCCH resource region determination module and a transmission module.

The ePDCCH resource region determination module is configured to determine an ePDCCH resource region of a terminal in a current subframe according to at least one of the following parameters:

the number of Resource Elements (REs) available for carrying control information in a Resource Block (RB) or an enhanced Control Channel Element (eCCE) or an enhanced Resource Element Group (eREG) in the current subframe;

aggregation level configuration needed to be detected by the terminal;

a type of an ePDCCH transmission mode for transmitting the control signaling to the terminal, comprising: a single beamforming transmission mode, i.e., a single-layer transmission technology using one demodulation reference signal port, a spatial diversity transmission mode, a centralized transmission mode, an a distributed transmission mode;

a subframe type of the current subframe;

a pilot transmission condition in the current subframe;

a synchronization signal transmission condition in the current subframe;

a Physical Broadcast Channel (PBCH) transmission condition in the current subframe; and a subframe number of the current subframe;

the transmission module is configured to transmit control signaling to the terminal on some or all of the resources in the ePDCCH resource region.

The resource block is a physical resource block pair or a virtual resource block.

The ePDCCH resource region determination module is further configured to determine the ePDCCH resource region of the terminal in the current subframe according to at least two of the parameters. At least two of the parameters comprise the subframe number of the current subframe.

The subframe type of the current subframe at least comprises one of the following types: a Time Division Multiplexing (TDD) special subframe type, a non-TDD special subframe type, a cyclic prefix type, a multicast broadcast single frequency network subframe type, a non-multicast broadcast single frequency network subframe type.

The pilot transmission condition in the current subframe at least comprises one of the following conditions: an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

The ePDCCH resource region determination module is further configured to: determine a set of ePDCCH resource regions from N sets of candidate ePDCCH resource regions, wherein N is an integer larger than 0.

The transmission module is configured to: notify information of the N sets of candidate ePDCCH resource regions to the terminal; or notify information and criterion of M sets of candidate ePDCCH resource regions capable of determining the information of the N sets of candidate ePDCCH resource regions to the terminal, wherein M is an integer larger than 0.

The ePDCCH resource region determination module is configured to determine the N sets of candidate ePDCCH resource regions according to an identity of the terminal.

There are overlapped resources in the N sets of candidate ePDCCH resource regions; when N is 2, two sets of candidate ePDCCH resource regions are in a subset relationship; and when N is 3, an union set of the first set of candidate ePDCCH resource regions and the second set of candidate ePDCCH resource regions is the first set of candidate ePDCCH resource regions.

A control signaling detection method in the present scheme comprises: a terminal determining an ePDCCH resource region of the terminal in a current subframe according to at least one of the following parameters, and detecting control signaling on some or all of the resources in the ePDCCH resource region:
the number of Resource Elements (REs) available for carrying control information in a Resource Block (RB) or an enhanced Control Channel Element (eCCE) or an enhanced Resource Element Group (eREG) in the current subframe;
aggregation level configuration needed to be detected by the terminal;
a type of an ePDCCH transmission mode for transmitting the control signaling to the terminal, comprising: a single beamforming transmission mode, i.e., a single-layer transmission technology using one demodulation reference signal port, a spatial diversity transmission mode, a centralized transmission mode, an a distributed transmission mode;
a subframe type of the current subframe;
a pilot transmission condition in the current subframe;
a synchronization signal transmission condition in the current subframe;
a Physical Broadcast Channel (PBCH) transmission condition in the current subframe; and
a subframe number of the current subframe.

The resource block is a physical resource block pair or a virtual resource block.

The terminal determines the ePDCCH resource region of the terminal in the current subframe according to at least two of the parameters. At least two of the parameters comprise the subframe number of the current subframe.

The subframe type of the current subframe at least comprises one of the following types: a Time Division Multiplexing (TDD) special subframe type, a non-TDD special subframe type, a cyclic prefix type, a multicast broadcast single frequency network subframe type, a non-multicast broadcast single frequency network subframe type.

The pilot transmission condition in the current subframe at least comprises one of the following conditions: an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

A terminal determining an ePDCCH resource region of the terminal in a current subframe comprises: determining a set of ePDCCH resource regions from N sets of candidate ePDCCH resource regions, wherein N is an integer larger than 0.

The terminal acquiring information of the N sets of candidate ePDCCH resource regions from the base station; or
the terminal determining the N sets of candidate ePDCCH resource regions according to an identity of the terminal; or
the terminal determining the information of the N sets of candidate ePDCCH resource regions according to information and criterion of M sets of candidate ePDCCH resource regions received from the base station, wherein M is an integer larger than 0.

There are overlapped resources in the N sets of candidate ePDCCH resource regions; when N is 2, two sets of candidate ePDCCH resource regions are in a subset relationship; and when N is 3, an union set of the first set of candidate ePDCCH resource regions and the second set of candidate ePDCCH resource regions is the first set of candidate ePDCCH resource regions.

A terminal in the present scheme comprises an ePDCCH resource region determination module and a detection module.

The ePDCCH resource region determination module is configured to determine an ePDCCH resource region of the terminal in a current subframe according to at least one of the following parameters:
the number of Resource Elements (REs) available for carrying control information in a Resource Block (RB) or an enhanced Control Channel Element (eCCE) or an enhanced Resource Element Group (eREG) in the current subframe;
aggregation level configuration needed to be detected by the terminal;
a type of an ePDCCH transmission mode for transmitting the control signaling to the terminal, comprising: a single beamforming transmission mode, i.e., a single-layer transmission technology using one demodulation reference signal port, a spatial diversity transmission mode, a centralized transmission mode, an a distributed transmission mode;
a subframe type of the current subframe;
a pilot transmission condition in the current subframe;
a synchronization signal transmission condition in the current subframe;
a Physical Broadcast Channel (PBCH) transmission condition in the current subframe; and
a subframe number of the current subframe.

The detection module is configured to detect control signaling on some or all of the resources in the ePDCCH resource region.

The ePDCCH resource region determination module is further configured to: determine the ePDCCH resource region of the terminal in the current subframe according to at least two of the parameters. At least two of the parameters comprise the subframe number of the current subframe.

The resource block is a physical resource block pair or a virtual resource block.

The subframe type of the current subframe at least comprises one of the following types: a Time Division Multiplexing (TDD) special subframe type, a non-TDD special subframe type, a cyclic prefix type, a multicast broadcast single frequency network subframe type, a non-multicast broadcast single frequency network subframe type.

The pilot transmission condition in the current subframe at least comprises one of the following conditions: an overhead size of a Common Reference Signal (CRS) in the current subframe, an overhead size of a Channel State Information Reference Signal (CSI-RS) in the current subframe, and an overhead size of a Positioning Reference Signal (PRS) in the current sub frame.

The ePDCCH resource region determination module is configured to: determine a set of ePDCCH resource regions from N sets of candidate ePDCCH resource regions, wherein N is an integer larger than 0.

The ePDCCH resource region determination module is configured to: acquire information of the N sets of candidate ePDCCH resource regions from the base station; or determine the N sets of candidate ePDCCH resource regions according to an identity of the terminal; or determine the information of the N sets of candidate ePDCCH resource regions according to information and criterion of M sets of candidate ePDCCH resource regions received from the base station, wherein M is an integer larger than 0.

There are overlapped resources in the N sets of candidate ePDCCH resource regions; when N is 2, two sets of candidate ePDCCH resource regions are in a subset relationship; and when N is 3, an union set of the first set of candidate ePDCCH resource regions and the second set of candidate ePDCCH resource regions is the first set of candidate ePDCCH resource regions.

The present document will be described in detail through specific embodiments below.

Specific Embodiment One:

a base station (eNodeB) notifies a terminal (UE) of information of multiple sets of candidate ePDCCH resource Regions. Specifically, the base station may notify the UE through RRC signaling.

For example, candidate ePDCCH resource Regions notified by the base station to the terminal through signaling may be the following two sets of Regions:

Region 1: PRB pair1, PRB pair3, PRB pair6, PRB pair8, PRB pair11, PRB pair13, PRB pair15, and PRB pair18.

Region 2: PRB pair1, PRB pair6, PRB pair11, and PRB pair15.

Or the base station determines multiple sets of candidate ePDCCH resource Regions according to a UE ID (C-RNTI) of the terminal needing to transmit the control signaling. For example, the 2 Regions are determined according to the UE ID and an algorithm pre-appointed by the base station and the terminal.

It is also possible that the base station notifies the terminal of information of a set of candidate ePDCCH resource Regions, and the base station determines information of other one or more sets of candidate ePDCCH resource Regions according to the information of the set of candidate ePDCCH resource Regions and a criterion appointed by the base station and the terminal.

For example, the base station only notifies the terminal of Region 1: PRB pair1, PRB pair3, PRB pair6, PRB pair8, PRB pair11, PRB pair13, PRB pair15, and PRB pair18.

The base station and the terminal pre-appoint to extract 4 PRB pairs at regular intervals from Region 1 as Region2, or select the first 4 PRBs as Region 3.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the Epdcch Resource Region according to the number of REs of the eCCE in the current subframe (a subframe needed to transmit the control signaling) available for carrying control information. The base station selects the Epdcch Resource Region as Region2 when the number of REs of the eCCE available for carrying control information is larger than a threshold value V, and selects the Epdcch Resource Region as Region1 when the number of REs of the eCCE available for carrying control information is less than or equal to the threshold V.

Or the base station determines the Epdcch Resource Region according to the number of REs of the PRB pair in the current subframe (a subframe needed to transmit the control signaling) available for carrying control information. The base station selects the Epdcch Resource Region as Region2 when the number of REs of the PRB available for carrying control information is larger than a threshold value V, and selects the Epdcch Resource Region as Region1 when the number of REs of the PRB pair available for carrying control information is less than or equal to the threshold V.

Or the base station determines the Epdcch Resource Region according to the number of REs of the eREG in the current subframe (a subframe needed to transmit the control signaling) available for carrying control information. The base station selects the Epdcch Resource Region as Region2 when the number of REs of the eREG available for carrying control information is larger than a threshold value V, and selects the Epdcch Resource Region as Region1 when the number of REs of the eREG available for carrying control information is less than or equal to the threshold V.

Figure 6:
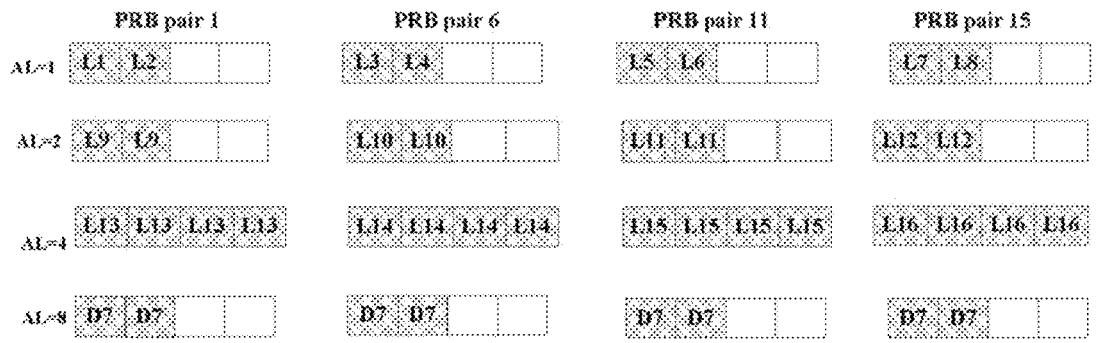
FIG. 6 is a diagram of aggregation levels and candidate regions in a search space when region 2 is selected in specific embodiments one and twenty.

After the Region is determined, the base station determines a search space in the Region through appointment between the base station and the terminal or through configuration of signaling. The search space is comprised of multiple ePDCCH candidates under multiple aggregation levels. For example, if the determined ePDCCH resource Region is Region2, the aggregation levels and candidates included in the search space are as shown in FIG. 6.

Figures 7, 8:
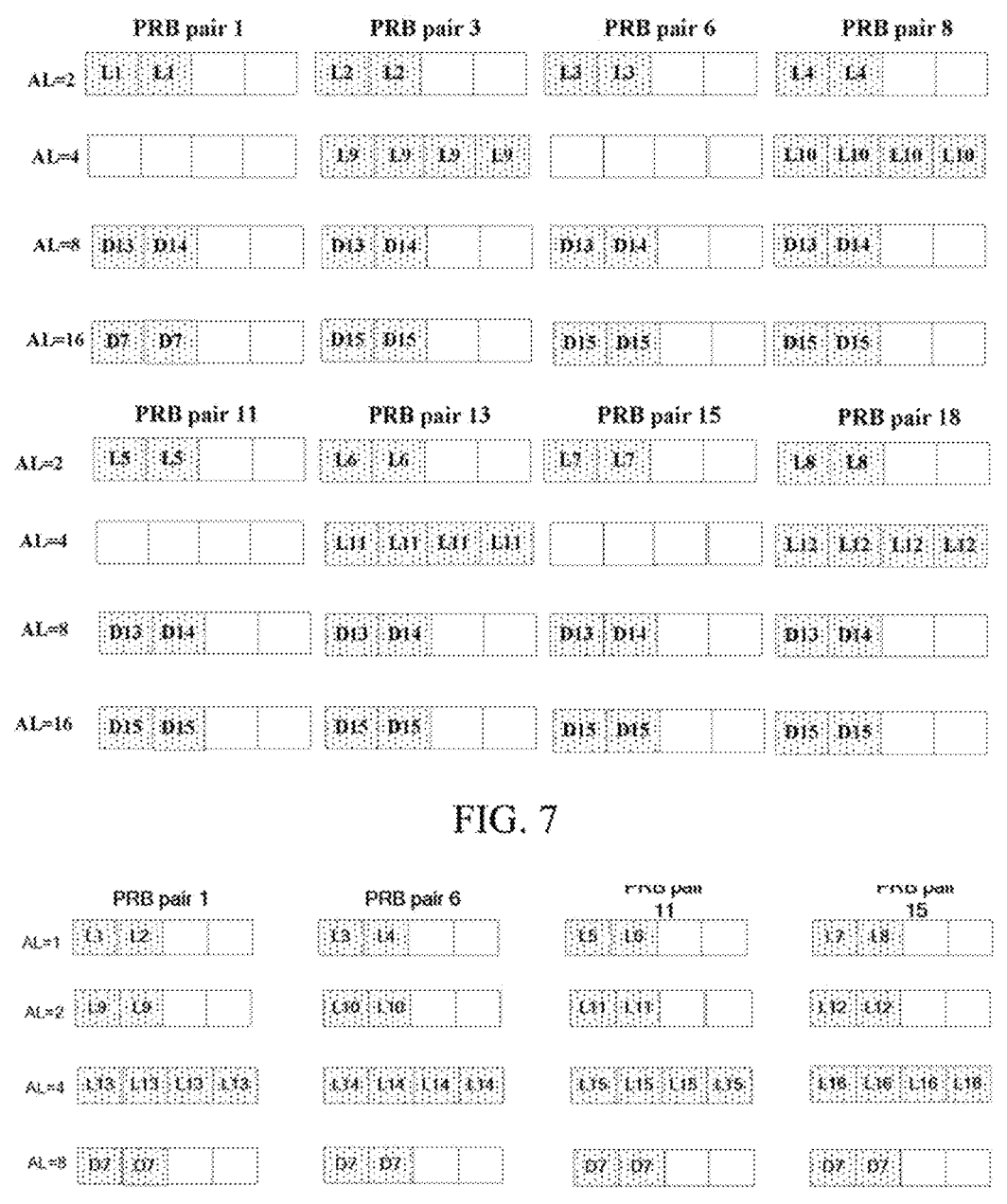

If the determined ePDCCH resource Region is Region1, the aggregation levels and candidates included in the search space are as shown in FIG. 7. One grid in the figure represents an L-eCCE, which is comprised of 2 eREGs.

The base station selects one of the candidates for transmitting control information according to the determined ePDCCH resource region, specifically, the ePDCCH candidates included in the search space in the region.

Specific Embodiment Two:

a base station (eNodeB) notifies a terminal (UE) of information of multiple sets of candidate ePDCCH resource Regions. Specifically, the base station may notify the UE through RRC signaling.

For example, candidate ePDCCH resource Regions notified by the base station to the terminal through signaling may be the following two sets of Regions:

Region 1: PRB pair1, PRB pair3, PRB pair6, PRB pair8, PRB pair11, PRB pair13, PRB pair15, and PRB pair18.

Region 2: PRB pair1, PRB pair6, PRB pair11, and PRB pair15.

Or the base station determines multiple sets of candidate ePDCCH resource Regions according to a UE ID (C-RNTI) of the terminal needing to transmit the control signaling. For example, the 2 Regions are determined according to the UE ID and an algorithm pre-appointed by the base station and the terminal.

It is also possible that the base station notifies the terminal of information of a set of candidate ePDCCH resource Regions, and the base station determines information of other one or more sets of candidate ePDCCH resource Regions according to the information of the set of candidate ePDCCH resource Regions and a criterion appointed by the base station and the terminal.

For example, the base station only notifies the terminal of Region 1: PRB pair1, PRB pair3, PRB pair6, PRB pair8, PRB pair11, PRB pair13, PRB pair15, and PRB pair18.

The base station and the terminal pre-appoint to extract 4 PRB pairs at regular intervals from Region 1 as Region1, or select the first 4 PRBs as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the used Epdcch Resource Region according to the total number of REs of the eCCE predefined in the current subframe (a subframe needed to transmit the control signaling) unavailable for carrying control information due to pilot transmission, occupation of PDCCH symbols, and other conditions. The base station selects the Epdcch Resource Region as Region2 when the number of REs of the eCCE unavailable for carrying control information is larger than a threshold value V, and selects the Epdcch Resource Region as Region1 when the number of REs of the eCCE unavailable for carrying control information is less than or equal to the threshold V.

The base station determines the used Epdcch Resource Region according to the total number of REs of the eREG predefined in the current subframe (a subframe needed to transmit the control signaling) unavailable for carrying control information due to pilot transmission, occupation of PDCCH symbols, and other conditions. The base station selects the Epdcch Resource Region as Region2 when the number of REs of the eREG unavailable for carrying control information is larger than a threshold value X, and selects the Epdcch Resource Region as Region1 when the number of REs of the eREG unavailable for carrying control information is less than or equal to the threshold X.

The base station determines the used Epdcch Resource Region according to the total number of REs of the PRB pair predefined in the current subframe (a subframe needed to transmit the control signaling) unavailable for carrying control information due to pilot transmission, occupation of PDCCH symbols, and other conditions. The base station selects the Epdcch Resource Region as Region2 when the number of REs of the PRB pair unavailable for carrying control information is larger than a threshold value V, and selects the Epdcch Resource Region as Region1 when the number of REs of the PRB pair unavailable for carrying control information is less than or equal to the threshold X.

After the Region is determined, the base station determines a search space in the Region through appointment between the base station and the terminal or through configuration of signaling. The search space is comprised of multiple ePDCCH candidates under multiple aggregation levels. For example, if the determined ePDCCH resource Region is Region2, the aggregation levels and candidates included in the search space are as shown in FIG. 8.

Figures 9, 10:
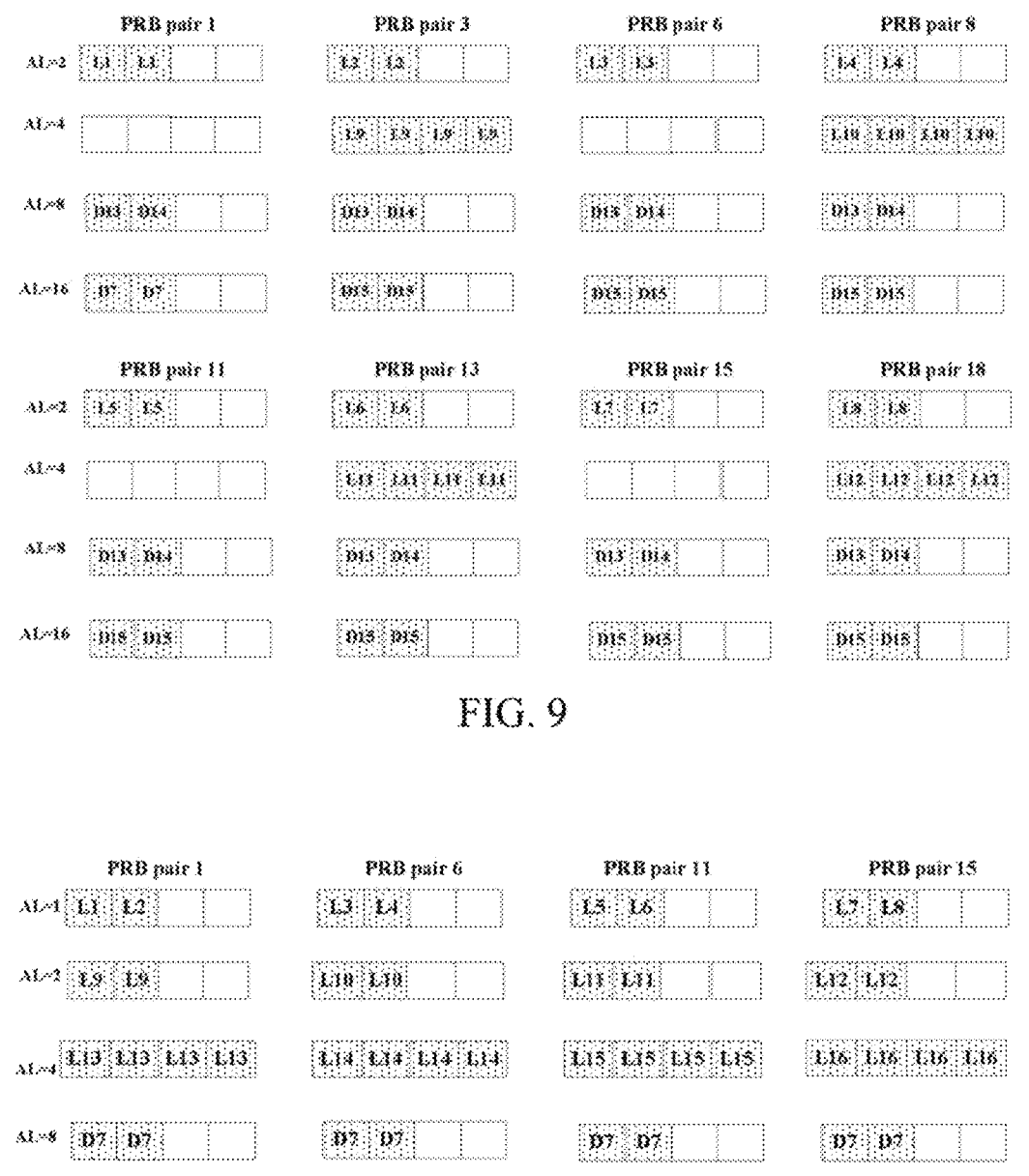

If the determined ePDCCH resource Region is Region1, the aggregation levels and candidates included in the search space are as shown in FIG. 9. One grid in the figure represents an L-eCCE, which is comprised of 2 eREGs.

The base station selects one of the candidates for transmitting control information according to the determined ePDCCH resource region, specifically, the ePDCCH candidates included in the search space in the region.

Specific Embodiment Three:

a base station (eNodeB) notifies a terminal (UE) of information of multiple sets of candidate ePDCCH resource Regions. Specifically, the base station may notify the UE through RRC signaling.

For example, candidate ePDCCH resource Regions notified by the base station to the terminal through signaling may be the following three sets of Regions:

Region 1: PRB pair1, PRB pair3, PRB pair6 PRB pair8, PRB pair11, PRB pair13, PRB pair15, and PRB pair18.

Region 2: PRB pair1, PRB pair6, PRB pair11, and PRB pair15.

Region 3: PRB pair3, PRB pair8, PRB pair13, and PRB pair18.

Or the base station determines multiple sets of candidate ePDCCH resource Regions according to a UE ID (C-RNTI) of the terminal needing to transmit the control signaling. For example, the above 3 Regions are determined according to the UE ID and an algorithm pre-appointed by the base station and the terminal.

It is also possible that the base station notifies the terminal of information of a set of candidate ePDCCH resource Regions, and the base station determines information of other one or more sets of candidate ePDCCH resource Regions according to the information of the set of candidate ePDCCH resource Regions and a criterion appointed by the base station and the terminal.

For example, the base station only notifies the terminal of Region 1: PRB pair1, PRB pair3, PRB pair6, PRB pair8, PRB pair11, PRB pair13, PRB pair15, and PRB pair18.

The base station and the terminal pre-appoint to extract 4 PRB pairs at regular intervals from Region 1 as Region2, and use other 4 PRB pairs as Region 3.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the Epdcch Resource Region according to the number of REs of the eCCE predefined in the current subframe (a subframe needed to transmit the control signaling) unavailable for carrying control information. The base station selects the Epdcch Resource Region as Region1 when the number of predefined REs of the eCCE unavailable for carrying control information is less than a threshold value X, selects the Epdcch Resource Region as Region2 when the number of the predefined REs of the eCCE unavailable for carrying control information is larger than or equal to the threshold X and the number of the current subframe is an odd, and selects the Epdcch Resource Region as Region3 when the number of the predefined REs of the eCCE unavailable for carrying control information is larger than or equal to the threshold X and the number of the current subframe is an even.

The base station determines the Epdcch Resource Region according to the number of REs of the eREG predefined in the current subframe (a subframe needed to transmit the control signaling) unavailable for carrying control information. The base station selects the Epdcch Resource Region as Region1 when the number of predefined REs of the eREG unavailable for carrying control information is less than a threshold value X, selects the Epdcch Resource Region as Region2 when the number of the predefined REs of the eREG unavailable for carrying control information is larger than or equal to the threshold X and the number of the current subframe is an odd, and selects the Epdcch Resource Region as Region3 when the number of the predefined REs of the eREG unavailable for carrying control information is larger than or equal to the threshold X and the number of the current subframe is an even.

The base station determines the used Epdcch Resource Region according to the number of REs of the PRB pair predefined in the current subframe (a subframe needed to transmit the control signaling) unavailable for carrying control information. The base station selects the Epdcch Resource Region as Region1 when the number of predefined REs of the PRB pair unavailable for carrying control information is less than a threshold value X, selects the Epdcch Resource Region as Region2 when the number of the predefined REs of the PRB pair unavailable for carrying control information is larger than or equal to the threshold X and the number of the current subframe is an odd, and selects the Epdcch Resource Region as Region3 when the number of the predefined REs of the PRB pair unavailable for carrying control information is larger than or equal to the threshold X and the number of the current subframe is an even.

After the Region is determined, the base station determines a search space in the Region through appointment between the base station and the terminal or through configuration of signaling. The search space is comprised of multiple ePDCCH candidates under multiple aggregation levels. For example, if the determined ePDCCH resource Region is Region2, the aggregation levels and candidates included in the search space are as shown in FIG. 10.

Figures 11, 12:
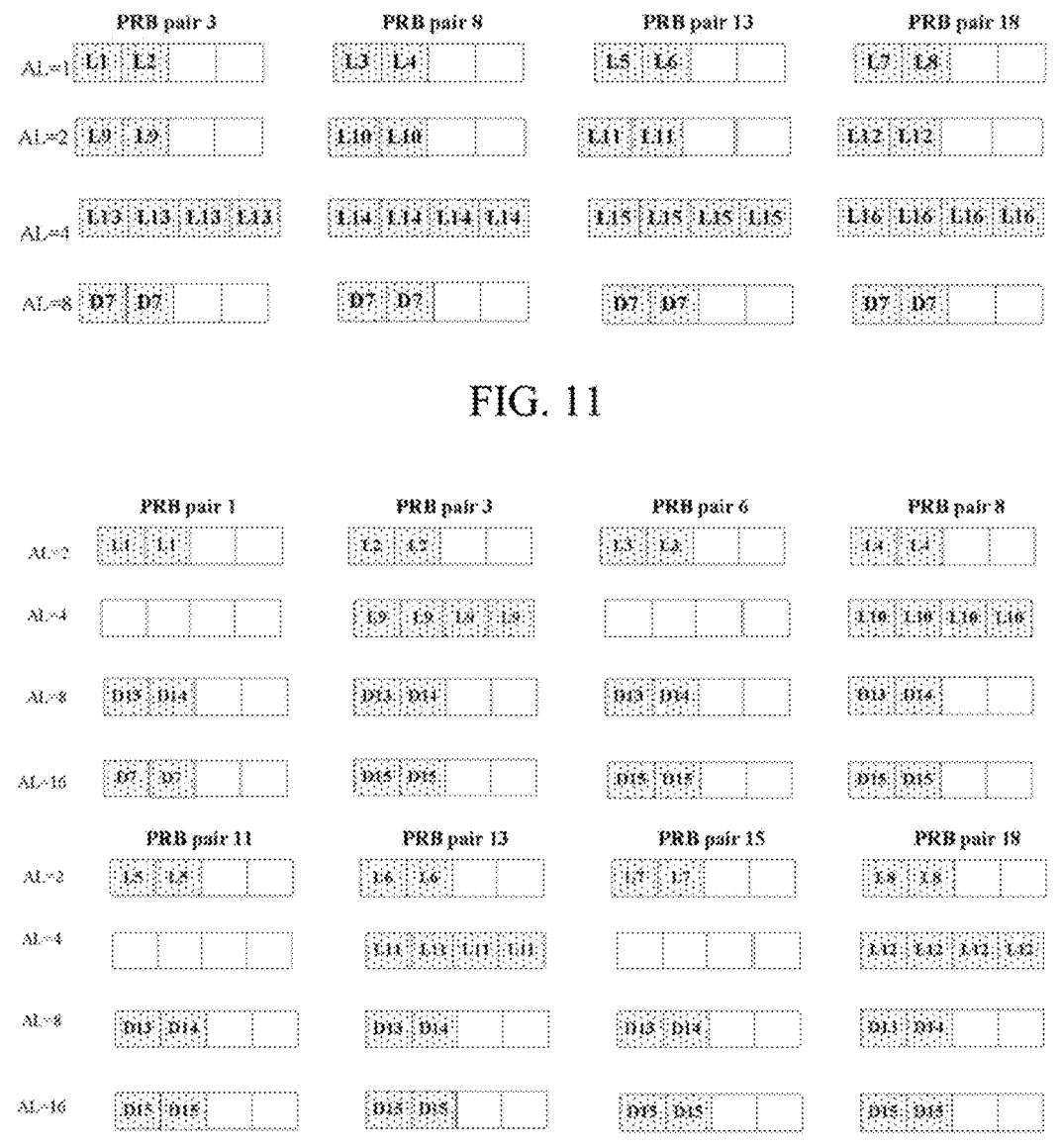

If the determined ePDCCH resource Region is Region3, the aggregation levels and candidates included in the search space are as shown in FIG. 11, If the determined ePDCCH resource Region is Region1, the aggregation levels and candidates included in the search space are as shown in FIG. 12. One grid in the figure represents an L-eCCE, which is comprised of 2 eREGs.

The base station selects one of the candidates for transmitting control information according to the determined ePDCCH resource region, specifically, the ePDCCH candidates included in the search space in the region.

Specific Embodiment Four:

a base station (eNodeB) notifies a terminal (UE) of information of multiple sets of candidate ePDCCH resource Regions. Specifically, the base station may notify the UE through RRC signaling.

For example, candidate ePDCCH resource Regions notified by the base station to the terminal through signaling may be the following three sets of Regions:

Region 1: PRB pair 1, PRB pair 2, PRB pair5, PRB pair6, PRB pair9, PRB pair10, PRB pair13, and PRB pair14.

Region 2: PRB pair1, PRB pair5, PRB pair9, and PRB pair13.

Region 3: PRB pair 2, PRB pair6, PRB pair10, and PRB pair14.

Or the base station determines multiple sets of candidate ePDCCH resource Regions according to a UE ID (C-RNTI) of the terminal needing to transmit the control signaling. For example, the above 3 Regions are determined according to the UE ID and an algorithm pre-appointed by the base station and the terminal.

It is also possible that the base station notifies the terminal of information of a set of candidate ePDCCH resource Regions, and the base station determines information of other one or more sets of candidate ePDCCH resource Regions according to the information of the set of candidate ePDCCH resource Regions and a criterion appointed by the base station and the terminal.

For example, the base station only notifies the terminal of Region 2: PRB pair1, PRB pair5, PRB pair9, and PRB pair13.

The base station and the terminal pre-appoint to use PRB pair indexes+1 from Region 2 as Region3, and use and a union set of Region2 and Region 3 as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the Epdcch Resource Region according to the number of REs of the eCCE predefined in the current subframe (a subframe needed to transmit the control signaling) unavailable for carrying control information. The base station selects the Epdcch Resource Region as Region1 when the number of predefined REs of the eCCE unavailable for carrying control information is larger than or equal to a threshold value V, selects the Epdcch Resource Region as Region2 when the number of the predefined REs of the eCCE unavailable for carrying control information is less than the threshold V and the number of the current subframe is an odd, and selects the Epdcch Resource Region as Region3 when the number of the predefined REs of the eCCE unavailable for carrying control information is less than the threshold V and the number of the current subframe is an even.

The base station determines the Epdcch Resource Region according to the number of REs of the eREG predefined in the current subframe (a subframe needed to transmit the control signaling) unavailable for carrying control information. The base station selects the Epdcch Resource Region as Region1 when the number of predefined REs of the eREG unavailable for carrying control information is larger than or equal to a threshold value V, selects the Epdcch Resource Region as Region2 when the number of the predefined REs of the eREG unavailable for carrying control information is less than the threshold V and the number of the current subframe is an odd, and selects the Epdcch Resource Region as Region3 when the number of the predefined REs of the eREG unavailable for carrying control information is less than the threshold V and the number of the current subframe is an even.

The base station determines the Epdcch Resource Region according to the number of REs of the PRB pair predefined in the current subframe (a subframe needed to transmit the control signaling) available for carrying control information. The base station selects the Epdcch Resource Region as Region1 when the number of predefined REs of the PRB pair unavailable for carrying control information is larger than or equal to a threshold value V, selects the Epdcch Resource Region as Region2 when the number of the predefined REs of the PRB pair unavailable for carrying control information is less than the threshold V and the number of the current subframe is an odd, and selects the Epdcch Resource Region as Region3 when the number of the predefined REs of the PRB pair unavailable for carrying control information is less than the threshold V and the number of the current subframe is an even.

After the Region is determined, the base station determines a search space in the Region through appointment between the base station and the terminal or through configuration of signaling. The search space is comprised of multiple ePDCCH candidates under multiple aggregation levels.

The base station selects one of the candidates for transmitting control information according to the determined ePDCCH resource region, specifically, the ePDCCH candidates included in the search space in the region.

Specific Embodiment Five:

a base station (eNodeB) notifies a terminal (UE) of information of multiple sets of candidate ePDCCH resource Regions. Specifically, the base station may notify the UE through RRC signaling.

For example, candidate ePDCCH resource Regions notified by the base station to the terminal through signaling may be the following three sets of Regions:

Region 1: eCCE 1, eCCE 2, eCCE 3, eCCE 4, eCCE 11, eCCE 12, eCCE 13, eCCE 14, eCCE 21, eCCE 22, eCCE 23, eCCE 24, eCCE 31, eCCE 32, eCCE 33, and eCCE 34.

Region 2: eCCE 1, eCCE 2, eCCE 11, eCCE 12, eCCE 21, eCCE 22, eCCE 31, and eCCE 32.

Region 3: eCCE 3, eCCE 4, eCCE 13, eCCE 14, eCCE 23, eCCE 24, eCCE 33, and eCCE 34.

Or the base station determines multiple sets of candidate ePDCCH resource Regions according to a UE ID (C-RNTI) of the terminal needing to transmit the control signaling. For example, the above 3 Regions are determined according to the UE ID and an algorithm pre-appointed by the base station and the terminal.

It is also possible that the base station notifies the terminal of information of a set of candidate ePDCCH resource Regions, and the base station determines information of other one or more sets of candidate ePDCCH resource Regions according to the information of the set of candidate ePDCCH resource Regions and a criterion appointed by the base station and the terminal.

For example, the base station only notifies the terminal of Region 2: eCCE 1, eCCE 2, eCCE 11, eCCE 12, eCCE 21, eCCE 22, eCCE 31, and eCCE 32.

The base station and the terminal pre-appoint to use eCCE indexes+1 from Region 2 as Region3, and use and a union set of Region2 and Region 3 as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the Epdcch Resource Region according to the number of REs of the eCCE predefined in the current subframe (a subframe needed to transmit the control signaling) unavailable for carrying control information. The base station selects the Epdcch Resource Region as Region1 when the number of predefined REs of the eCCE unavailable for carrying control information is larger than or equal to a threshold value V, selects the Epdcch Resource Region as Region2 when the number of the predefined REs of the eCCE unavailable for carrying control information is less than the threshold V and the number of the current subframe is an odd, and selects the Epdcch Resource Region as Region3 when the number of the predefined REs of the eCCE unavailable for carrying control information is less than the threshold V and the number of the current subframe is an even.

The base station determines the Epdcch Resource Region according to the number of REs of the eREG predefined in the current subframe (a subframe needed to transmit the control signaling) unavailable for carrying control information. The base station selects the Epdcch Resource Region as Region1 when the number of predefined REs of the eREG unavailable for carrying control information is larger than or equal to a threshold value V, selects the Epdcch Resource Region as Region2 when the number of the predefined REs of the eREG unavailable for carrying control information is less than the threshold V and the number of the current subframe is an odd, and selects the Epdcch Resource Region as Region3 when the number of the predefined REs of the eREG unavailable for carrying control information is less than the threshold V and the number of the current subframe is an even.

The base station determines the Epdcch Resource Region according to the number of REs of the PRB pair predefined in the current subframe (a subframe needed to transmit the control signaling) available for carrying control information. The base station selects the Epdcch Resource Region as Region1 when the number of predefined REs of the PRB pair unavailable for carrying control information is larger than or equal to a threshold value V, selects the Epdcch Resource Region as Region2 when the number of the predefined REs of the PRB pair unavailable for carrying control information is less than the threshold V and the number of the current subframe is an odd, and selects the Epdcch Resource Region as Region3 when the number of the predefined REs of the PRB pair unavailable for carrying control information is less than the threshold V and the number of the current subframe is an even.

After the Region is determined, the base station determines a search space in the Region through appointment between the base station and the terminal or through configuration of signaling. The search space is comprised of multiple ePDCCH candidates under multiple aggregation levels.

The base station selects one of the candidates for transmitting control information according to the determined ePDCCH resource region, specifically, the ePDCCH candidates included in the search space in the region.

Specific Embodiment Six:

a base station (eNodeB) notifies a terminal (UE) of information of multiple sets of candidate ePDCCH resource Regions. Specifically, the base station may notify the UE through RRC signaling.

For example, candidate ePDCCH resource Regions notified by the base station to the terminal through signaling may be the following three sets of Regions:

Region 1: eREG 1, eREG 2, eREG 3, eREG 4, eREG 11, eREG 12, eREG 13, eREG 14, eREG 21, eREG 22, eREG 23, eREG 24, eREG 31, eREG 32, eREG 33, and eREG 34.

Region 2: eREG 1, eREG 2, eREG 11, eREG 12, eREG 21, eREG 22, eREG 31, and eREG 32.

Region 3: eREG 3, eREG 4, eREG 13, eREG 14, eREG 23, eREG 24, eREG 33, and eREG 34.

Or the base station determines multiple sets of candidate ePDCCH resource Regions according to a UE ID (C-RNTI) of the terminal needing to transmit the control signaling. For example, the above 3 Regions are determined according to the UE ID and an algorithm pre-appointed by the base station and the terminal.

It is also possible that the base station notifies the terminal of information of a set of candidate ePDCCH resource Regions, and the base station determines information of other one or more sets of candidate ePDCCH resource Regions according to the information of the set of candidate ePDCCH resource Regions and a criterion appointed by the base station and the terminal.

For example, the base station only notifies the terminal of Region 3: eREG 3, eREG 4, eREG 13, eREG 14, eREG 23, eREG 24, eREG 33, and eREG 34.

The base station and the terminal pre-appoint to use eCCE indexes-1 from Region 3 as Region2, and use and a union set of Region2 and Region 3 as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the Epdcch Resource Region according to the number of REs of the eCCE predefined in the current subframe (a subframe needed to transmit the control signaling) unavailable for carrying control information. The base station selects the Epdcch Resource Region as Region1 when the number of predefined REs of the eCCE unavailable for carrying control information is larger than or equal to a threshold value V, selects the Epdcch Resource Region as Region2 when the number of the predefined REs of the eCCE unavailable for carrying control information is less than the threshold V and the number of the current subframe is an odd, and selects the Epdcch Resource Region as Region3 when the number of the predefined REs of the eCCE unavailable for carrying control information is less than the threshold V and the number of the current subframe is an even.

The base station determines the Epdcch Resource Region according to the number of REs of the eREG predefined in the current subframe (a subframe needed to transmit the control signaling) unavailable for carrying control information. The base station selects the Epdcch Resource Region as Region1 when the number of predefined REs of the eREG unavailable for carrying control information is larger than or equal to a threshold value V, selects the Epdcch Resource Region as Region2 when the number of the predefined REs of the eREG unavailable for carrying control information is less than the threshold V and the number of the current subframe is an odd, and selects the Epdcch Resource Region as Region3 when the number of the predefined REs of the eREG unavailable for carrying control information is less than the threshold V and the number of the current subframe is an even.

The base station determines the Epdcch Resource Region according to the number of REs of the PRB pair predefined in the current subframe (a subframe needed to transmit the control signaling) available for carrying control information. The base station selects the Epdcch Resource Region as Region1 when the number of predefined REs of the PRB pair unavailable for carrying control information is larger than or equal to a threshold value V, selects the Epdcch Resource Region as Region2 when the number of the predefined REs of the PRB pair unavailable for carrying control information is less than the threshold V and the number of the current subframe is an odd, and selects the Epdcch Resource Region as Region3 when the number of the predefined REs of the PRB pair unavailable for carrying control information is less than the threshold V and the number of the current subframe is an even.

After the Region is determined, the base station determines a search space in the Region through appointment between the base station and the terminal or through configuration of signaling. The search space is comprised of multiple ePDCCH candidates under multiple aggregation levels.

The base station selects one of the candidates for transmitting control information according to the determined ePDCCH resource region, specifically, the ePDCCH candidates included in the search space in the region.

Specific Embodiment Seven:

a base station (eNodeB) notifies a terminal (UE) of information of multiple sets of candidate ePDCCH resource Regions. Specifically, the base station may notify the UE through RRC signaling.

For example, candidate ePDCCH resource Regions notified by the base station to the terminal through signaling may be the following two sets of Regions:

Region 1: VRB 1, VRB pair3, VRB pair6, VRB pair8, VRB pair11, VRB 13, VRB 15, and VRB 18.

Region 2: VRB 1, VRB 6, VRB 11, and VRB 15.

Or the base station determines multiple sets of candidate ePDCCH resource Regions according to a UE ID (C-RNTI) of the terminal needing to transmit the control signaling. For example, the 2 Regions are determined according to the UE ID and an algorithm pre-appointed by the base station and the terminal.

It is also possible that the base station notifies the terminal of information of a set of candidate ePDCCH resource Regions, and the terminal determines information of other one or more sets of candidate ePDCCH resource Regions according to the information of the set of candidate ePDCCH resource Regions and a criterion appointed by the base station and the terminal.

For example, the base station only notifies the terminal of Region 1: VRB 1, VRB 3, VRB 6, VRB 8, VRB 11, VRB 13, VRB 15, and VRB 18.

The base station and the terminal pre-appoint to extract 4 VRBs at regular intervals from Region 1 as Region1, or select the first 4 VRBs as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The VRB is a virtual RB constituted by part of resources of multiple PRB pairs.

The base station determines the Epdcch Resource Region according to the number of REs of the eCCE in the current subframe (a subframe needed to transmit the control signaling) available for carrying control information. The base station selects the Epdcch Resource Region as Region2 when the number of REs of the eCCE available for carrying control information is larger than a threshold value V, and selects the Epdcch Resource Region as Region1 when the number of REs of the eCCE available for carrying control information is less than or equal to the threshold V.

Or the base station determines the Epdcch Resource Region according to the number of REs of the VRB in the current subframe (a subframe needed to transmit the control signaling) available for carrying control information. The base station selects the Epdcch Resource Region as Region2 when the number of REs of the VRB available for carrying control information is larger than a threshold value V, and selects the Epdcch Resource Region as Region1 when the number of REs of the VRB available for carrying control information is less than or equal to the threshold V.

Or the base station determines the Epdcch Resource Region according to the number of REs of the eREG in the current subframe (a subframe needed to transmit the control signaling) available for carrying control information. The base station selects the Epdcch Resource Region as Region2 when the number of REs of the eREG available for carrying control information is larger than a threshold value V, and selects the Epdcch Resource Region as Region1 when the number of REs of the eREG available for carrying control information is less than or equal to the threshold V.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Eight:

a base station determines next two sets of candidate Epdcch resource Regions, for example:

Region 1: PRB pair 1, PRB pair3, PRB pair6, PRB pair8, PRB pair 11, PRB pair13, PRB pair15 and PRB pair 18.

Region 2: PRB pair 1, PRB pair6, PRB pair 11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to the aggregation level which should be detected by the UE in the current subframe (a subframe needed to transmit the control signaling).

For example, when the needed aggregation level is {1, 2, 4, 8}, the ePDCCH resource region is determined to be Region2, which is a region with less PRBs here.

When the aggregation level needed to be detected is {2, 4, 8, 16}, the ePDCCH resource region is determined to be Region1, which is a region with more PRBs here.

Or when the needed aggregation level is {1, 2, 4}, the ePDCCH resource region is determined to be Region2, which is a region with less PRBs here.

When the aggregation level needed to be detected is {2, 4, 8}, the ePDCCH resource region is determined to be Region1, which is a region with more PRBs here.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Nine:

a base station determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Region 3: PRB pair 1, PRB pair2, PRB pair 14, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to the aggregation level which should be detected by the UE in the current subframe (a subframe needed to transmit the control signaling).

For example, when the needed aggregation level is {1, 2, 4, 8} and a number of the current subframe is an odd, the ePDCCH resource region is determined to be Region2.

When the needed aggregation level is {1, 2, 4, 8} and a number of the current subframe is an even, the ePDCCH resource region is determined to be Region3.

When the aggregation level needed to be detected is {2, 4, 8, 16}, the ePDCCH resource region is determined to be Region1, which is a region with more PRBs here.

Or when the needed aggregation level is {1, 2, 4, 8} and a number of the current subframe is an odd, the ePDCCH resource region is determined to be Region2.

When the needed aggregation level is {1, 2, 4, 8} and a number of the current subframe is an even, the ePDCCH resource region is determined to be Region3.

When the aggregation level needed to be detected is {2, 4, 8}, the ePDCCH resource region is determined to be Region1, which is a region with more PRBs here.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Ten:

a base station determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to an ePDCCH transmission technology for transmitting control information to the UE in the current subframe (a subframe needed to transmit the control signaling).

For example, when spatial diversity transmission is used (two or more DMRS dedicated pilot ports are used in one PRB pair when control signaling of the same UE is transmitted), the ePDCCH resource region is determined to be Region1, which is a region with more PRBs here.

When single layer beamforming is used (one DMRS dedicated pilot port is used in one PRB pair when control signaling of the same UE is transmitted), the ePDCCH resource region is determined to be Region2, which is a region with less PRBs here.

After the Region is determined, the base station determines a search space in the Region through appointment between the base station and the terminal or through configuration of signaling. The search space is comprised of multiple ePDCCH candidates under multiple aggregation levels.

The base station selects one of the candidates for transmitting control information according to the determined ePDCCH resource region, specifically, the ePDCCH candidates included in the search space in the region.

Specific Embodiment Eleven:

a base station determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Region 3: PRB pair 1, PRB pair2, PRB pair 14 , and PRB pair15.

The base station determines the ePDCCH resource region of the subframe according to an ePDCCH transmission technology for transmitting control information to the UE in the current subframe (a subframe needed to transmit the control signaling).

For example, when single layer beamforming is used (one DMRS dedicated pilot port is used in one PRB pair when control signaling of the same UE is transmitted) and a number of the current subframe is an odd, the ePDCCH resource region is determined to be Region2.

When single layer beamforming is used (one DMRS dedicated pilot port is used in one PRB pair when control signaling of the same UE is transmitted) and a number of the current subframe is an even, the ePDCCH resource region is determined to be Region3.

When spatial diversity transmission is used (two or more DMRS dedicated pilot ports are used in one PRB pair when control signaling of the same UE is transmitted), the ePDCCH resource region is determined to be Region1, which is a region with more PRBs here.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Twelve:

a base station determines next two sets of candidate Epdcch resource Regions, for example:

Region 1: PRB pair 1, PRB pair3, PRB pair6, PRB pair8, PRB pair 11, PRB pair13, PRB pair15 and PRB pair 18.

Region 2: PRB pair 1, PRB pair6, PRB pair 11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to an ePDCCH transmission technology for transmitting control information to the UE in the current subframe (a subframe needed to transmit the control signaling).

For example, when distributed transmission is used (control signaling resources are discontinuous), the ePDCCH resource region is determined to be Region1, which is a region with more PRBs here.

When centralized transmission is used (control signaling resources are continuous), the ePDCCH resource region is determined to be Region2, which is a region with less PRBs here.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Thirteen:

a base station determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Region 3: PRB pair 1, PRB pair2, PRB pair 14, and PRB pair15.

The base station determines the ePDCCH resource region of the subframe according to an ePDCCH transmission technology for transmitting control information to the UE in the current subframe (a subframe needed to transmit the control signaling).

For example, when centralized transmission is used (control signaling resources are continuous) and a number of the current subframe is an odd, the ePDCCH resource region is determined to be Region2.

When centralized transmission is used (control signaling resources are continuous) and a number of the current subframe is an even, the ePDCCH resource region is determined to be Region3.

When distributed transmission is used (control signaling resources are discontinuous), the ePDCCH resource region is determined to be Region1, which is a region with more PRBs here.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Fourteen a base station determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair 6, PRB pair11, and PRB pair 15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to a subframe type of the current subframe (a subframe needed to transmit the control signaling).

For example, when the current subframe is a TDD special subframe, the ePDCCH resource region is determined to be Region1 which is a region with more PRBs here.

When the current subframe is not a TDD special subframe, the ePDCCH resource region is determined to be Region2 which is a region with less PRBs here.

The TDD special subframe is an uplink and downlink conversion subframe in a TDD system. As shown in the figure as follows, the subframe is comprised of a DwPTS GP and an UpPTS. More specifically, the subframe may include some configurations as follows, as shown in Table two.

TABLE TWO

| | Special subframe configuration | | | | | |
| --- | --- | --- | --- | --- | --- | --- |
| | Normal cyclic prefix in downlink | | | Extended cyclic prefix in downlink | | |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592\text{-}T_m$ | $2192\text{-}T_m$ | $2560\text{-}T_m$ | $7680\text{-}T_m$ | $2192\text{-}T_m$ | $2560\text{-}T_m$ |
| 1 | $19760\text{-}T_m$ | | | $20480\text{-}T_m$ | | |
| 2 | $21952\text{-}T_m$ | | | $23040\text{-}T_m$ | | |
| 3 | $24144\text{-}T_m$ | | | $25600\text{-}T_m$ | | |
| 4 | $26336\text{-}T_m$ | | | $7680\text{-}T_m$ | $4384\text{-}T_m$ | $5120\text{-}T_m$ |
| 5 | $6592\text{-}T_m$ | $4384\text{-}T_m$ | $5120\text{-}T_m$ | $20480\text{-}T_m$ | | |
| 6 | $19760\text{-}T_m$ | | | $23040\text{-}T_m$ | | |
| 7 | $21952\text{-}T_m$ | | | — | — | — |
| 8 | $24144\text{-}T_m$ | | | — | — | — |

Further, the determination may be based on following conditions.

For example, when the current subframe is a TDD special subframe and has a Normal CP, if configurations 0, 1, 5 and 6 are used, the ePDCCH resource region is determined to be Region1 which is a region with more PRBs here.

When the current subframe is a TDD special subframe and has a Normal CP, if configurations 1, 2, 3, 5 and 6 are used, the ePDCCH resource region is determined to be Region2 which is a region with less PRBs here.

When the current subframe is not a TDD special subframe and has a Normal CP, the ePDCCH resource region is determined to be Region2 which is a region with less PRBs here.

When the current subframe has an Extend CP, the ePDCCH resource region is determined to be Region1 which is a region with more PRBs here.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Fifteen:

a base station determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to a subframe type of the current subframe (a subframe needed to transmit the control signaling).

When the current subframe is a non-MBSFN subframe, the ePDCCH resource region is determined to be Region1 which is a region with more PRBs here.

When the current subframe is an MBSFN subframe, the ePDCCH resource region is determined to be Region2 which is a region with less PRBs here.

Or

For example, when the current subframe is a non-MBSFN subframe and has an Extend CP, the ePDCCH resource region is determined to be Region1 which is a region with more PRBs here.

When the current subframe is an MBSFN subframe or a subframe with a Normal CP, the ePDCCH resource region is determined to be Region2 which is a region with less PRBs here.

After the Region is determined, the base station determines a search space in the Region through appointment between the base station and the terminal or through configuration of signaling. The search space is comprised of multiple ePDCCH candidates under multiple aggregation levels.

The base station selects one of the candidates for transmitting control information according to the determined ePDCCH resource region, specifically, the ePDCCH candidates included in the search space in the region.

Specific Embodiment Sixteen:

a base station determines next two sets of candidate Epdcch resource Regions, for example:

Region 1: PRB pair 1, PRB pair3, PRB pair6, PRB pair8, PRB pair 11, PRB pair13, PRB pair15 and PRB pair 18.

Region 2: PRB pair 1, PRB pair6, PRB pair 11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to a pilot transmission condition of the current subframe.

When the current subframe is a subframe with a CRS to be transmitted, the ePDCCH resource region is determined to be Region1 which is a region with more PRBs here.

When the current subframe is a subframe without a CRS to be transmitted, the ePDCCH resource region is determined to be Region2 which is a region with less PRBs here.

Or

For example, when the current subframe is a subframe with a PRS to be transmitted, the ePDCCH resource region is determined to be Region1 which is a region with more PRBs here.

When the current subframe is a subframe without a PRS to be transmitted, the ePDCCH resource region is determined to be Region2 which is a region with less PRBs here.

Or

For example, when the current subframe is a subframe with a CRS and a CSI-RS to be transmitted, the ePDCCH resource region is determined to be Region1 which is a region with more PRBs here.

When the current subframe is a subframe without a CRS or CSI-RS to be transmitted, the ePDCCH resource region is determined to be Region2 which is a region with less PRBs here.

After the Region is determined, the base station determines a search space in the Region through appointment between the base station and the terminal or through configuration of signaling. The search space is comprised of multiple ePDCCH candidates under multiple aggregation levels.

The base station selects one of the candidates for transmitting control information according to the determined ePDCCH resource region, specifically, the ePDCCH candidates included in the search space in the region.

Specific Embodiment Seventeen:

a base station determines next two sets of candidate Epdcch resource Regions, for example:

Region 1: PRB pair 1, PRB pair6, PRB pair 11, and PRB pair15.

Region 2: PRB pair 1, PRB pair6, and PRB pair 11.

The base station determines the ePDCCH resource region of the subframe according to a synchronization signal transmission condition of the current subframe.

When there is no PBCH to be transmitted in the PRB pair 15 in the current subframe, the ePDCCH resource region is determined to be Region1 which is a region with more PRBs here.

When there is a PBCH to be transmitted in the PRB pair 15 in the current subframe, the ePDCCH resource region is determined to be Region2 which is a region with less PRBs here.

After the Region is determined, the base station determines a search space in the Region through appointment between the base station and the terminal or through configuration of signaling. The search space is comprised of multiple ePDCCH candidates under multiple aggregation levels.

The base station selects one of the candidates for transmitting control information according to the determined ePDCCH resource region, specifically, the ePDCCH candidates included in the search space in the region.

Specific Embodiment Eighteen:

a base station determines next two sets of candidate Epdcch resource Regions, for example:

Region 1: PRB pair 1, PRB pair6, PRB pair 11, and PRB pair 15.

Region 2: PRB pair 1, PRB pair6, and PRB pair 11.

The base station determines the ePDCCH resource region of the subframe according to a synchronization signal transmission condition of the current subframe.

When there is no synchronization signal to be transmitted in the PRB pair 15 in the current subframe, the ePDCCH resource region is determined to be Region1 which is a region with more PRBs here.

When there is a synchronization signal to be transmitted in the PRB pair 15 in the current subframe, the ePDCCH resource region is determined to be Region2 which is a region with less PRBs here.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Nineteen:

a base station determines next two sets of candidate Epdcch resource Regions, for example:

Region 1: PRB pair 1, PRB pair6, PRB pair11, PRB pair15, PRB pair 2, PRB pair7, PRB pair12, and PRB pair16.

Region 2: PRB pair 2, PRB pair7, PRB pair12, and PRB pair16.

The base station determines the ePDCCH resource region of the subframe according to a subframe number of the current subframe.

When the subframe number of the current subframe is an odd, the ePDCCH resource region is determined to be Region1 which is a region with more PRBs here.

When the subframe number of the current subframe is an even, the ePDCCH resource region is determined to be Region2 which is a region with less PRBs here.

After the Region is determined, the base station determines a search space in the Region through appointment between the base station and the terminal or through configuration of signaling. The search space is comprised of multiple ePDCCH candidates under multiple aggregation levels. The base station selects one of the candidates for transmitting control information according to the determined ePDCCH resource region, specifically, the ePDCCH candidates included in the search space in the region.

Specific Embodiment Twenty:

a terminal determines information of multiple sets of candidate ePDCCH resource Regions according to signaling notified by a base station (eNodeB). Specifically, the base station may notify the UE through RRC signaling.

For example, candidate ePDCCH resource Regions determined by the terminal according to the signaling notified by the base station may be the following two sets of Regions:

Region 1: PRB pair1, PRB pair3, PRB pair6, PRB pair8, PRB pair11, PRB pair13, PRB pair15, and PRB pair 18.

Region 2: PRB pair1, PRB pair6, PRB pair11, and PRB pair15.

Or the terminal determines multiple sets of candidate ePDCCH resource Regions according to a UE ID (C-RNTI). For example, the 2 Regions are determined according to the UE ID and an algorithm pre-appointed by the base station and the terminal.

It is also possible that the terminal determines information of a set of candidate ePDCCH resource Regions according to the signaling notified by the base station, and the terminal determines information of other one or more sets of candidate ePDCCH resource Regions according to the information of the set of candidate ePDCCH resource Regions and a criterion appointed by the base station and the terminal.

For example, the base station only notifies the terminal of Region 1: PRB pair1, PRB pair3, PRB pair6, PRB pair8, PRB pair11, PRB pair13, PRB pair15, and PRB pair18.

The base station and the terminal pre-appoint to extract 4 PRB pairs at regular intervals from Region 1 as Region1, or select the first 4 PRBs as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The terminal determines the Epdcch Resource Region according to the number of REs of the eCCE in the current subframe (a subframe needed to transmit the control signaling) available for carrying control information. The terminal selects the Epdcch Resource Region as Region2 when the number of REs of the eCCE available for carrying control information is larger than a threshold value V, and selects the Epdcch Resource Region as Region1 when the number of REs of the eCCE available for carrying control information is less than or equal to the threshold V.

Or the terminal determines the Epdcch Resource Region according to the number of REs of the PRB pair in the current subframe (a subframe needed to transmit the control signaling) available for carrying control information. The terminal selects the Epdcch Resource Region as Region2 when the number of REs of the PRB pair available for carrying control information is larger than a threshold value V, and selects the Epdcch Resource Region as Region1 when the number of REs of the PRB pair available for carrying control information is less than or equal to the threshold V.

Or the terminal determines the Epdcch Resource Region according to the number of REs of the eREG in the current subframe (a subframe needed to transmit the control signaling) available for carrying control information. The terminal selects the Epdcch Resource Region as Region2 when the number of REs of the eREG available for carrying control information is larger than a threshold value V, and selects the Epdcch Resource Region as Region1 when the number of REs of the eREG available for carrying control information is less than or equal to the threshold V.

After the Region is determined, the terminal performs detection in a search space determined in the Region by appointment between the base station and the terminal or by configuration of signaling. The search space is comprised of multiple ePDCCH candidates under multiple aggregation levels. For example, if the determined ePDCCH resource Region is Region2, the aggregation levels and candidates included in the search space are as shown in FIG. 6.

If the determined ePDCCH resource Region is Region1, the aggregation levels and candidates included in the search space are as shown in FIG. 7. One grid in the figure represents an L-eCCE, which is comprised of 2 eREGs.

The terminal further determines the ePDCCH candidates included in the search space in the region according to the ePDCCH resource region determined by it, and detects the above ePDCCH candidates.

Specific Embodiment Twenty-One:

a terminal determines information of multiple sets of candidate ePDCCH resource Regions according to signaling notified by a base station (eNodeB). Specifically, the base station may notify the UE through RRC signaling.

For example, candidate ePDCCH resource Regions determined by the terminal according to the signaling notified by the base station may be the following two sets of Regions:

Region 1: PRB pair1, PRB pair3, PRB pair6, PRB pair8, PRB pair11, PRB pair13, PRB pair15, and PRB pair18.

Region 2: PRB pair1, PRB pair6, PRB pair11, and PRB pair15.

Or the terminal determines multiple sets of candidate ePDCCH resource Regions according to a UE ID (C-RNTI). For example, the 2 Regions are determined according to the UE ID and an algorithm pre-appointed by the base station and the terminal.

It is also possible that the terminal determines information of a set of candidate ePDCCH resource Regions according to the signaling notified by the base station, and the terminal determines information of other one or more sets of candidate ePDCCH resource Regions according to the information of the set of candidate ePDCCH resource Regions and a criterion appointed by the base station and the terminal.

For example, the base station only notifies the terminal of Region 1: PRB pair1, PRB pair 3, PRB pair6, PRB pair8, PRB pair11, PRB pair13, PRB pair15, and PRB pair18.

The base station and the terminal pre-appoint to extract 4 PRB pairs at regular intervals from Region 1 as Region1, or select the first 4 PRBs as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The terminal determines the used Epdcch Resource Region according to the total number of REs of the eCCE predefined in the current subframe (a subframe needed to transmit the control signaling) unavailable for carrying control information due to pilot transmission, occupation of PDCCH symbols, and other conditions. The terminal selects the Epdcch Resource Region as Region2 when the number of REs of the eCCE unavailable for carrying control information is larger than a threshold value V, and selects the Epdcch Resource Region as Region1 when the number of REs of the eCCE unavailable for carrying control information is less than or equal to the threshold V.

The terminal determines the used Epdcch Resource Region according to the total number of REs of the eREG predefined in the current subframe (a subframe needed to transmit the control signaling) unavailable for carrying control information due to pilot transmission, occupation of PDCCH symbols, and other conditions. The terminal selects the Epdcch Resource Region as Region2 when the number of REs of the eREG unavailable for carrying control information is larger than a threshold value X, and selects the Epdcch Resource Region as Region1 when the number of REs of the eREG unavailable for carrying control information is less than or equal to the threshold X.

The terminal determines the used Epdcch Resource Region according to the total number of REs of the PRB pair predefined in the current subframe (a subframe needed to transmit the control signaling) unavailable for carrying control information due to pilot transmission, occupation of PDCCH symbols, and other conditions. The terminal selects the Epdcch Resource Region as Region2 when the number of REs of the PRB pair unavailable for carrying control information is larger than a threshold value V, and selects the Epdcch Resource Region as Region1 when the number of REs of the PRB pair unavailable for carrying control information is less than or equal to the threshold X.

After the Region is determined, the terminal performs detection in a search space in the Region determined by appointment between the base station and the terminal or by configuration of signaling. The search space is comprised of multiple ePDCCH candidates under multiple aggregation levels. For example, if the determined ePDCCH resource Region is Region2, the aggregation levels and candidates included in the search space are as shown in FIG. 8.

If the determined ePDCCH resource Region is Region1, the aggregation levels and candidates included in the search space are as shown in FIG. 9. One grid in the figure represents an L-eCCE, which is comprised of 2 eREGs.

The terminal further determines the ePDCCH candidates included in the search space in the region according to the ePDCCH resource region determined by it, and detects the above ePDCCH candidates.

Specific Embodiment Twenty-Two:

a terminal determines a terminal (UE) of information of multiple sets of candidate ePDCCH resource Regions according to signaling notified by a base station (eNodeB). Specifically, the base station may notify the UE through RRC signaling.

For example, candidate ePDCCH resource Regions determined by the terminal according to the signaling notified by the base station may be the following three sets of Regions:

Region1: PRB pair1, PRB pair3, PRB pair6, PRB pair8, PRB pair11, PRB pair13, PRB pair15, and PRB pair18.

Region 2: PRB pair1, PRB pair6, PRB pair11, and PRB pair15.

Region 3: PRB pair3, PRB pair8, PRB pair13, and PRB pair18.

Or the terminal determines multiple sets of candidate ePDCCH resource Regions according to a UE ID (C-RNTI). For example, the 3 Regions are determined according to the UE ID and an algorithm pre-appointed by the base station and the terminal.

It is also possible that the terminal determines the terminal of information of a set of candidate ePDCCH resource Regions according to the signaling notified by the base station, and the terminal determines information of other one or more sets of candidate ePDCCH resource Regions according to the information of the set of candidate ePDCCH resource Regions and a criterion appointed by the base station and the terminal.

For example, the base station only notifies the terminal of Region 1: PRB pair1, PRB pair3, PRB pair6, PRB pair8, PRB pair11, PRB pair13, PRB pair15, and PRB pair18.

The base station and the terminal pre-appoint to extract 4 PRB pairs at regular intervals from Region 1 as Region2, and use other 4 PRB pairs as Region 3.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The terminal determines the Epdcch Resource Region according to the number of REs of the eCCE predefined in the current subframe (a subframe needed to transmit the control signaling) unavailable for carrying control information. The terminal selects the Epdcch Resource Region as Region1 when the number of predefined REs of the eCCE unavailable for carrying control information is less than a threshold value X, selects the Epdcch Resource Region as Region2 when the number of the predefined REs of the eCCE unavailable for carrying control information is larger than or equal to the threshold X and the number of the current subframe is an odd, and selects the Epdcch Resource Region as Region3 when the number of the predefined REs of the eCCE unavailable for carrying control information is larger than or equal to the threshold X and the number of the current subframe is an even.

The terminal determines the Epdcch Resource Region according to the number of REs of the eREG predefined in the current subframe (a subframe needed to transmit the control signaling) unavailable for carrying control information. The terminal selects the Epdcch Resource Region as Region1 when the number of predefined REs of the eREG unavailable for carrying control information is less than a threshold value X, selects the Epdcch Resource Region as Region2 when the number of the predefined REs of the eREG unavailable for carrying control information is larger than or equal to the threshold X and the number of the current subframe is an odd, and selects the Epdcch Resource Region as Region3 when the number of the predefined REs of the eREG unavailable for carrying control information is larger than or equal to the threshold X and the number of the current subframe is an even.

The terminal determines the Epdcch Resource Region according to the number of REs of the PRB pair predefined in the current subframe (a subframe needed to transmit the control signaling) unavailable for carrying control information. The terminal selects the Epdcch Resource Region as Region1 when the number of predefined REs of the PRB pair unavailable for carrying control information is less than a threshold value X, selects the Epdcch Resource Region as Region2 when the number of the predefined REs of the PRB pair unavailable for carrying control information is larger than or equal to the threshold X and the number of the current subframe is an odd, and selects the Epdcch Resource Region as Region3 when the number of the predefined REs of the PRB pair unavailable for carrying control information is larger than or equal to the threshold X and the number of the current subframe is an even.

After the Region is determined, the base station performs detection in a search space in the Region determined by appointment between the base station and the terminal or by configuration of signaling. The search space is comprised of multiple ePDCCH candidates under multiple aggregation levels. For example, if the determined ePDCCH resource Region is Region2, the aggregation levels and candidates included in the search space are as shown in FIG. 10.

If the determined ePDCCH resource Region is Region3, the aggregation levels and candidates included in the search space are as shown in FIG. 11.

If the determined ePDCCH resource Region is Region1, the aggregation levels and candidates included in the search space are as shown in FIG. 12. One grid in the figure represents an L-eCCE, which is comprised of 2 eREGs.

The terminal further determines the ePDCCH candidates included in the search space in the region according to the ePDCCH resource region determined by it, and detects the above ePDCCH candidates.

Specific Embodiment Twenty-Three:

a terminal determines information of multiple sets of candidate ePDCCH resource Regions according to signaling notified by a base station (eNodeB). Specifically, the base station may notify the UE through RRC signaling.

For example, candidate ePDCCH resource Regions determined by the terminal according to signaling notified by the base station may be the following three sets of Regions:

Region 1: PRB pair 1, PRB pair 2, PRB pair5, PRB pair6, PRB pair9, PRB pair10, PRB pair13, and PRB pair14.

Region 2: PRB pair1, PRB pair5, PRB pair9, and PRB pair13.

Region 3: PRB pair 2, PRB pair6, PRB pair10, and PRB pair14.

Or the terminal determines multiple sets of candidate ePDCCH resource Regions according to a UE ID (C-RNTI). For example, the 3 Regions are determined according to the UE ID and an algorithm pre-appointed by the base station and the terminal.

It is also possible that the terminal determines information of a set of candidate ePDCCH resource Regions according to the signaling notified by the base station, and the terminal determines information of other one or more sets of candidate ePDCCH resource Regions according to the information of the set of candidate ePDCCH resource Regions and a criterion appointed by the base station and the terminal.

For example, the base station only notifies the terminal of Region 2: PRB pair1, PRB pair5, PRB pair9, and PRB pair13.

The base station and the terminal pre-appoint to use PRB pair indexes+1 from Region 2 as Region3, and use and a union set of Region2 and Region 3 as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The terminal determines the Epdcch Resource Region according to the number of REs of the eCCE predefined in the current subframe (a subframe needed to transmit the control signaling) unavailable for carrying control information. The terminal selects the Epdcch Resource Region as Region1 when the number of predefined REs of the eCCE unavailable for carrying control information is larger than or equal to a threshold value V, selects the Epdcch Resource Region as Region2 when the number of the predefined REs of the eCCE unavailable for carrying control information is less than the threshold V and the number of the current subframe is an odd, and selects the Epdcch Resource Region as Region3 when the number of the predefined REs of the eCCE unavailable for carrying control information is less than the threshold V and the number of the current subframe is an even.

The terminal determines the Epdcch Resource Region according to the number of REs of the eREG predefined in the current subframe (a subframe needed to transmit the control signaling) unavailable for carrying control information. The terminal selects the Epdcch Resource Region as Region1 when the number of predefined REs of the eREG unavailable for carrying control information is larger than or equal to a threshold value V, selects the Epdcch Resource Region as Region2 when the number of the predefined REs of the eREG unavailable for carrying control information is less than the threshold V and the number of the current subframe is an odd, and selects the Epdcch Resource Region as Region3 when the number of the predefined REs of the eREG unavailable for carrying control information is less than the threshold V and the number of the current subframe is an even.

The terminal determines the Epdcch Resource Region according to the number of REs of the PRB pair predefined in the current subframe (a subframe needed to transmit the control signaling) available for carrying control information. The terminal selects the Epdcch Resource Region as Region1 when the number of predefined REs of the PRB pair unavailable for carrying control information is larger than or equal to a threshold value V, selects the Epdcch Resource Region as Region2 when the number of the predefined REs of the PRB pair unavailable for carrying control information is less than the threshold V and the number of the current subframe is an odd, and selects the Epdcch Resource Region as Region3 when the number of the predefined REs of the PRB pair unavailable for carrying control information is less than the threshold V and the number of the current subframe is an even.

After the Region is determined, the terminal station performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Twenty-Four:

a terminal determines information of multiple sets of candidate ePDCCH resource Regions according to signaling notified by a base station (eNodeB). Specifically, the base station may notify the UE through RRC signaling.

For example, candidate ePDCCH resource Regions determined by the terminal according to the signaling notified by the base station may be the following three sets of Regions:

Region 1: eCCE 1, eCCE 2, eCCE 3, eCCE 4, eCCE 11, eCCE 12, eCCE 13, eCCE 14, eCCE 21, eCCE 22, eCCE 23, eCCE24, eCCE 31, eCCE 32, eCCE 33, and eCCE 34.

Region 2: eCCE 1, eCCE 2, eCCE 11, eCCE 12, eCCE 21, eCCE 22, eCCE 31, and eCCE 32.

Region 3: eCCE 3, eCCE 4, eCCE13, eCCE 14, eCCE 23, eCCE 24, eCCE 33, and eCCE 34.

Or the terminal determines multiple sets of candidate ePDCCH resource Regions according to a UE ID (C-RNTI). For example, the 3 Regions are determined according to the UE ID and an algorithm pre-appointed by the base station and the terminal.

It is also possible that the terminal determines the terminal of information of a set of candidate ePDCCH resource Regions according to the signaling notified by the base station, and the terminal determines information of other one or more sets of candidate ePDCCH resource Regions according to the information of the set of candidate ePDCCH resource Regions and a criterion appointed by the base station and the terminal.

For example, the base station only notifies the terminal of Region 2: eCCE 1, eCCE 2, eCCE 11, eCCE 12, eCCE 21, eCCE 22, eCCE 31, and eCCE 32.

The base station and the terminal pre-appoint to use eCCE indexes+1 from Region 2 as Region3, and use and a union set of Region2 and Region 3 as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The terminal determines the Epdcch Resource Region according to the number of REs of the eCCE predefined in the current subframe (a subframe needed to transmit the control signaling) unavailable for carrying control information. The terminal selects the Epdcch Resource Region as Region1 when the number of predefined REs of the eCCE unavailable for carrying control information is larger than or equal to a threshold value V, selects the Epdcch Resource Region as Region2 when the number of the predefined REs of the eCCE unavailable for carrying control information is less than the threshold V and the number of the current subframe is an odd, and selects the Epdcch Resource Region as Region3 when the number of the predefined REs of the eCCE unavailable for carrying control information is less than the threshold V and the number of the current subframe is an even.

The terminal determines the Epdcch Resource Region according to the number of REs of the eREG predefined in the current subframe (a subframe needed to transmit the control signaling) unavailable for carrying control information. The terminal selects the Epdcch Resource Region as Region1 when the number of predefined REs of the eREG unavailable for carrying control information is larger than or equal to a threshold value V, selects the Epdcch Resource Region as Region2 when the number of the predefined REs of the eREG unavailable for carrying control information is less than the threshold V and the number of the current subframe is an odd, and selects the Epdcch Resource Region as Region3 when the number of the predefined REs of the eREG unavailable for carrying control information is less than the threshold V and the number of the current subframe is an even.

The terminal determines the Epdcch Resource Region according to the number of REs of the PRB pair predefined in the current subframe (a subframe needed to transmit the control signaling) available for carrying control information. The terminal selects the Epdcch Resource Region as Region1 when the number of predefined REs of the PRB pair unavailable for carrying control information is larger than or equal to a threshold value V, selects the Epdcch Resource Region as Region2 when the number of the predefined REs of the PRB pair unavailable for carrying control information is less than the threshold V and the number of the current subframe is an odd, and selects the Epdcch Resource Region as Region3 when the number of the predefined REs of the PRB pair unavailable for carrying control information is less than the threshold V and the number of the current subframe is an even.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Twenty-Five:

a terminal determines information of multiple sets of candidate ePDCCH resource Regions according to signaling notified by a base station (eNodeB). Specifically, the base station may notify the UE through RRC signaling.

For example, candidate ePDCCH resource Regions determined by the terminal according to the signaling notified by the base station may be the following three sets of Regions:

Region 1: eREG 1, eREG 2, eREG 3, eREG 4, eREG 11, eREG 12, eREG 13, eREG 14, eREG 21, eREG 22, eREG 23, eREG 24, eREG 31, eREG 32, eREG 33, and eREG 34.

Region 2: eREG 1, eREG 2, eREG 11, eREG 12, eREG 21, eREG 22, eREG 31, and eREG 32.

Region 3: eREG 3, eREG 4, eREG 13, eREG 14, eREG 23, eREG 24, eREG 33, and eREG 34.

Or the terminal determines multiple sets of candidate ePDCCH resource Regions according to a UE ID (C-RNTI). For example, the 3 Regions are determined according to the UE ID and an algorithm pre-appointed by the base station and the terminal.

It is also possible that the terminal determines information of a set of candidate ePDCCH resource Regions according to the signaling notified by the base station, and the terminal determines information of other one or more sets of candidate ePDCCH resource Regions according to the information of the set of candidate ePDCCH resource Regions and a criterion appointed by the base station and the terminal.

For example, the base station only notifies the terminal of Region 3: eREG 3, eREG 4, eREG 13, eREG 14, eREG 23, eREG 24, eREG 33, eREG 34.

The base station and the terminal pre-appoint to use eCCE indexes-1 from Region 3 as Region2, and use and a union set of Region2 Region 3 Region 1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The terminal determines the Epdcch Resource Region according to the number of REs of the eCCE predefined in the current subframe (a subframe needed to transmit the control signaling) unavailable for carrying control information. The terminal selects the Epdcch Resource Region as Region1 when the number of predefined REs of the eCCE unavailable for carrying control information is larger than or equal to a threshold value V, selects the Epdcch Resource Region as Region2 when the number of the predefined REs of the eCCE unavailable for carrying control information is less than the threshold V and the number of the current subframe is an odd, and selects the Epdcch Resource Region as Region3 when the number of the predefined REs of the eCCE unavailable for carrying control information is less than the threshold V and the number of the current subframe is an even.

The terminal determines the Epdcch Resource Region according to the number of REs of the eREG predefined in the current subframe (a subframe needed to transmit the control signaling) unavailable for carrying control information. The terminal selects the Epdcch Resource Region as Region1 when the number of predefined REs of the eREG unavailable for carrying control information is larger than or equal to a threshold value V, selects the Epdcch Resource Region as Region2 when the number of the predefined REs of the eREG unavailable for carrying control information is less than the threshold V and the number of the current subframe is an odd, and selects the Epdcch Resource Region as Region3 when the number of the predefined REs of the eREG unavailable for carrying control information is less than the threshold V and the number of the current subframe is an even.

The terminal determines the Epdcch Resource Region according to the number of REs of the PRB pair predefined in the current subframe (a subframe needed to transmit the control signaling) available for carrying control information. The terminal selects the Epdcch Resource Region as Region1 when the number of predefined REs of the PRB pair unavailable for carrying control information is larger than or equal to a threshold value V, selects the Epdcch Resource Region as Region2 when the number of the predefined REs of the PRB pair unavailable for carrying control information is less than the threshold V and the number of the current subframe is an odd, and selects the Epdcch Resource Region as Region3 when the number of the predefined REs of the PRB pair unavailable for carrying control information is less than the threshold V and the number of the current subframe is an even.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Twenty-Six:

a terminal determines information of multiple sets of candidate ePDCCH resource Regions according to signaling notified by a base station (eNodeB). Specifically, the base station may notify the UE through RRC signaling.

For example, candidate ePDCCH resource Regions determined by the terminal according to the signaling notified by the base station to the terminal through signaling may be the following two sets of Regions:

Region 1: VRB 1, VRB pair3, VRB pair6, VRB pair8, VRB pair11, VRB 13, VRB 15, and VRB 18.

Region 2: VRB 1, VRB 6, VRB 11, and VRB 15.

Or the terminal determines multiple sets of candidate ePDCCH resource Regions according to a UE ID (C-RNTI). For example, the 3 Regions are determined according to the UE ID and an algorithm pre-appointed by the base station and the terminal.

It is also possible that the terminal determines the terminal of information of a set of candidate ePDCCH resource Regions according to the signaling notified by the base station, and the terminal determines information of other one or more sets of candidate ePDCCH resource Regions according to the information of the set of candidate ePDCCH resource Regions and a criterion appointed by the base station and the terminal.

For example, the base station only notifies the terminal of Region 1: VRB 1, VRB 3, VRB 6, VRB 8, VRB 11, VRB 13, VRB 15, and VRB 18.

The base station and the terminal pre-appoint to extract 4 VRBs at regular intervals from Region 1 as Region1, or select the first 4 VRBs as Region1.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The VRB is a virtual RB constituted by a part of resources of multiple PRB pairs.

The terminal determines the Epdcch Resource Region according to the number of REs of the eCCE in the current subframe (a subframe needed to transmit the control signaling) available for carrying control information. The terminal selects the Epdcch Resource Region as Region2 when the number of REs of the eCCE available for carrying control information is larger than a threshold value V, and selects the Epdcch Resource Region as Region1 when the number of REs of the eCCE available for carrying control information is less than or equal to the threshold V.

Or the terminal determines the Epdcch Resource Region according to the number of REs of the VRB in the current subframe (a subframe needed to transmit the control signaling) available for carrying control information. The terminal selects the Epdcch Resource Region as Region2 when the number of REs of the VRB available for carrying control information is larger than a threshold value V, and selects the Epdcch Resource Region as Region1 when the number of REs of the VRB available for carrying control information is less than or equal to the threshold V.

Or the terminal determines the Epdcch Resource Region according to the number of REs of the eREG in the current subframe (a subframe needed to transmit the control signaling) available for carrying control information. The terminal selects the Epdcch Resource Region as Region2 when the number of REs of the eREG available for carrying control information is larger than a threshold value V, and selects the Epdcch Resource Region as Region1 when the number of REs of the eREG available for carrying control information is less than or equal to the threshold V.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Twenty-Seven:

a terminal determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair 11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The terminal determines the ePDCCH resource region of the subframe according to the aggregation level which should be detected by the UE in the current subframe (a subframe needed to transmit the control signaling).

For example, when the needed aggregation level is {1, 2, 4, 8}, the ePDCCH resource region is determined to be Region2, which is a region with less PRBs here.

When the aggregation level needed to be detected is {2, 4, 8, 16}, the ePDCCH resource region is determined to be Region1, which is a region with more PRBs here.

Or when the needed aggregation level is {1, 2, 4}, the ePDCCH resource region is determined to be Region2, which is a region with less PRBs here.

When the aggregation level needed to be detected is {2, 4, 8}, the ePDCCH resource region is determined to be Region1, which is a region with more PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Twenty-Eight:

a terminal determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair 6, PRB pair11, and PRB pair15.

Region 3: PRB pair 1, PRB pair2, PRB pair 14, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to the aggregation level which should be detected by the UE in the current subframe (a subframe needed to transmit the control signaling).

For example, when the needed aggregation level is {1, 2, 4, 8} and a number of the current subframe is an odd, the ePDCCH resource region is determined to be Region2.

When the needed aggregation level is {1, 2, 4, 8} and a number of the current subframe is an even, the ePDCCH resource region is determined to be Region3.

When the aggregation level needed to be detected is {2, 4, 8, 16}, the ePDCCH resource region is determined to be Region1, which is a region with more PRBs here.

Or when the needed aggregation level is {1, 2, 4, 8} and a number of the current subframe is an odd, the ePDCCH resource region is determined to be Region2.

When the needed aggregation level is {1, 2, 4, 8} and a number of the current subframe is an even, the ePDCCH resource region is determined to be Region3.

When the aggregation level needed to be detected is {2, 4, 8}, the ePDCCH resource region is determined to be Region1, which is a region with more PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Twenty-Nine:

a terminal determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to an ePDCCH transmission technology for transmitting control information to the UE in the current subframe (a subframe needed to transmit the control signaling).

For example, when spatial diversity transmission is used (two or more DMRS dedicated pilot ports are used in one PRB pair when control signaling of the same UE is transmitted), the ePDCCH resource region is determined to be Region1, which is a region with more PRBs here.

When single layer beamforming is used (one DMRS dedicated pilot port is used in one PRB pair when control signaling of the same UE is transmitted), the ePDCCH resource region is determined to be Region 2, which is a region with less PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Thirty:

a terminal determines next three sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Region 3: PRB pair 1, PRB pair2, PRB pair 14, and PRB pair15.

The base station determines the ePDCCH resource region of the subframe according to an ePDCCH transmission technology for transmitting control information to the UE in the current subframe (a subframe needed to transmit the control signaling).

For example, when single layer beamforming is used (one DMRS dedicated pilot port is used in one PRB pair when control signaling of the same UE is transmitted) and a number of the current subframe is an odd, the ePDCCH resource region is determined to be Region2.

When single layer beamforming is used (one DMRS dedicated pilot port is used in one PRB pair when control signaling of the same UE is transmitted) and a number of the current subframe is an even, the ePDCCH resource region is determined to be Region3.

When spatial diversity transmission is used (two or more DMRS dedicated pilot ports are used in one PRB pair when control signaling of the same UE is transmitted), the ePDCCH resource region is determined to be Region1, which is a region with more PRBs here. After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidatess.

Specific Embodiment Thirty-One:

a terminal determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to an ePDCCH transmission technology for transmitting control information to the UE in the current subframe (a subframe needed to transmit the control signaling).

For example, when distributed transmission is used (control signaling resources are discontinuous), the ePDCCH resource region is determined to be Region1, which is a region with more PRBs here.

When centralized transmission is used (control signaling resources are continuous), the ePDCCH resource region is determined to be Region2, which is a region with less PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Thirty-Two:

a terminal determines next three sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair 6, PRB pair11, and PRB pair15.

Region 3: PRB pair 1, PRB pair2, PRB pair 14, and PRB pair15.

The base station determines the ePDCCH resource region of the subframe according to an ePDCCH transmission technology for transmitting control information to the UE in the current subframe (a subframe needed to transmit the control signaling).

For example, when centralized transmission is used (control signaling resources are continuous) and a number of the current subframe is an odd, the ePDCCH resource region is determined to be Region2.

When centralized transmission is used (control signaling resources are continuous) and a number of the current subframe is an even, the ePDCCH resource region is determined to be Region3.

When distributed transmission is used (control signaling resources are discontinuous), the ePDCCH resource region is determined to be Region1, which is a region with more PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Thirty-Three:

a terminal determines next two sets of candidate Epdcch resource Regions, for example:

Region 1: PRB pair 1, PRB pair3, PRB pair6, PRB pair8, PRB pair 11, PRB pair13, PRB pair15 and PRB pair 18.

Region 2: PRB pair 1, PRB pair6, PRB pair 11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to a subframe type of the current subframe (a subframe needed to transmit the control signaling).

For example, when the current subframe is a TDD special subframe, the ePDCCH resource region is determined to be Region1 which is a region with more PRBs here.

When the current subframe is not a TDD special subframe, the ePDCCH resource region is determined to be Region2 which is a region with less PRBs here.

The TDD special subframe is an uplink and downlink conversion subframe in a TDD system, and is comprised of a DwPTS GP and an UpPTS.

More specifically, the subframe may include some configurations as shown in Table two. Further, it may be based on following conditions.

For example, when the current subframe is a TDD special subframe and has a Normal CP, if configurations 0, 1, 5 and 6 are used, the ePDCCH resource region is determined to be Region1 which is a region with more PRBs here.

When the current subframe is a TDD special subframe and has a Normal CP, if configurations 1, 2, 3, 5 and 6 are used, the ePDCCH resource region is determined to be Region2 which is a region with less PRBs here.

When the current subframe is not a TDD special subframe and has a Normal CP, the ePDCCH resource region is determined to be Region2 which is a region with less PRBs here.

When the current subframe has an Extend CP, the ePDCCH resource region is determined to be Region1 which is a region with more PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Thirty-Four:

a terminal determines next two sets of candidate Epdcch resource Regions, for example:

Region 1: PRB pair 1, PRB pair3, PRB pair6, PRB pair8, PRB pair 11, PRB pair13, PRB pair15 and PRB pair 18.

Region 2: PRB pair 1, PRB pair6, PRB pair 11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to a subframe type of the current subframe (a subframe needed to transmit the control signaling).

When the current subframe is a non-MBSFN subframe, the ePDCCH resource region is determined to be Region1 which is a region with more PRBs here.

When the current subframe is an MBSFN subframe, the ePDCCH resource region is determined to be Region2 which is a region with less PRBs here.

Or

For example, when the current subframe is a non-MBSFN subframe and has an Extend CP, the ePDCCH resource region is determined to be Region1 which is a region with more PRBs here.

When the current subframe is an MBSFN subframe or a subframe with a Normal CP, the ePDCCH resource region is determined to be Region2 which is a region with less PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Thirty-Five:

a terminal determines next two sets of candidate Epdcch resource Regions, for example:

Region 1: PRB pair 1, PRB pair3, PRB pair6, PRB pair8, PRB pair11, PRB pair13, PRB pair15 and PRB pair 18.

Region 2: PRB pair 1, PRB pair6, PRB pair11, and PRB pair15.

Here, the position of the ePDCCH resource region is primarily used to indicate frequency-domain positions, and time-domain positions may be determined according to the number of symbols occupied by the signaling or control signaling of old releases, which are multiple continuous OFDM symbols.

The base station determines the ePDCCH resource region of the subframe according to a pilot transmission condition of the current subframe.

When the current subframe is a subframe with a CRS to be transmitted, the ePDCCH resource region is determined to be Region1 which is a region with more PRBs here.

When the current subframe is a subframe without a CRS to be transmitted, the ePDCCH resource region is determined to be Region2 which is a region with less PRBs here.

Or

For example, when the current subframe is a subframe with a PRS to be transmitted, the ePDCCH resource region is determined to be Region1 which is a region with more PRBs here.

When the current subframe is a subframe without a PRS to be transmitted, the ePDCCH resource region is determined to be Region2 which is a region with less PRBs here.

Or

For example, when the current subframe is a subframe with a CRS and a CSI-RS to be transmitted, the ePDCCH resource region is determined to be Region1 which is a region with more PRBs here.

When the current subframe is a subframe without a CRS or CSI-RS to be transmitted, the ePDCCH resource region is determined to be Region2 which is a region with less PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Thirty-Six:

a terminal determines next two sets of candidate Epdcch resource Regions, for example:

Region 1: PRB pair 1, PRB pair6, PRB pair11, and PRB pair15.

Region 2: PRB pair 1, PRB pair6, and PRB pair11.

The base station determines the ePDCCH resource region of the subframe according to a synchronization signal transmission condition of the current subframe.

When there is no PBCH to be transmitted in the PRB pair 15 in the current subframe, the ePDCCH resource region is determined to be Region1 which is a region with more PRBs here.

When there is a PBCH to be transmitted in the PRB pair 15 in the current subframe, the ePDCCH resource region is determined to be Region2 which is a region with less PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Thirty-Seven:

a terminal determines next two sets of candidate Epdcch resource Regions, for example:

Region 1: PRB pair 1, PRB pair6, PRB pair11, and PRB pair15.

Region 2: PRB pair 1, PRB pair6, and PRB pair11.

The base station determines the ePDCCH resource region of the subframe according to a synchronization signal transmission condition of the current subframe.

When there is no synchronization signal to be transmitted in the PRB pair 15 in the current subframe, the ePDCCH resource region is determined to be Region1 which is a region with more PRBs here.

When there is a synchronization signal to be transmitted in the PRB pair 15 in the current subframe, the ePDCCH resource region is determined to be Region2 which is a region with less PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

Specific Embodiment Thirty-Eight:

a terminal determines next two sets of candidate Epdcch resource Regions, for example:

Region 1: PRB pair 1, PRB pair6, PRB pair11, PRB pair15, PRB pair 2, PRB pair7, PRB pair12, and PRB pair16.

Region 2: PRB pair 2, PRB pair7, PRB pair12, and PRB pair16.

The base station determines the ePDCCH resource region of the subframe according to a subframe number of the current subframe.

When the subframe number of the current subframe is an odd, the ePDCCH resource region is determined to be Region1 which is a region with more PRBs here.

When the subframe number of the current subframe is an even, the ePDCCH resource region is determined to be Region2 which is a region with less PRBs here.

After the Region is determined, the terminal performs detection in a search space in the Region determined by appointment between the base station and the terminal or by configuration of signaling. The search space is comprised of multiple ePDCCH candidates under multiple aggregation levels.

The terminal further determines the ePDCCH candidates included in the search space in the region according to the ePDCCH resource region determined by it, and detects the above ePDCCH candidates.

It should be illustrated that, in the case of no conflict, the embodiments of the present application and the features in the embodiments could be combined randomly with each other.

Of course, the present document can have a plurality of other embodiments. Without departing from the spirit and substance of the present document, those skilled in the art can make various corresponding changes and variations according to the present document, and all these corresponding changes and variations should belong to the protection scope of the appended claims in the present document.

A person having ordinary skill in the art can understand that all or part of steps in the above method can be implemented by programs instructing related hardware, which can be stored in a computer readable storage medium, such as a read-only memory, a disk or a disc etc. Alternatively, all or part of steps in the above embodiments can also be implemented by one or more integrated circuits. Accordingly, each module/unit in the above embodiments can be implemented in the form of hardware, or can also be implemented in the form of software functional module. The present document is not limited to any particular form of a combination of hardware and software.

INDUSTRIAL APPLICABILITY

The above technical scheme can adapt to the dynamically-changing transmission capabilities of subframes, improves the transmission performance of the control signaling on an ePDCCH, increases the accuracy of the terminal in searching for the control signaling, and conserves terminal consumption. Therefore, the present document has a great industrial applicability.

What is claimed is:

1. A control signaling transmission method, comprising:
    determining, by a base station, a plurality sets of candidate enhanced Physical Downlink Control Channel (ePDCCH) resource regions;
    notifying, by the base station, one set of candidate ePDCCH resource regions and a preset rule to the terminal, to make the terminal determine one or more other sets of candidate ePDCCH resource regions according to the notified set of candidate ePDCCH resource regions and the preset rule, wherein the determined one or more other sets of candidate ePDCCH resource regions and the notified set of candidate ePDCCH resource regions in the terminal are the same with the plurality sets of candidate ePDCCH resource regions in the base station;
    determining, by the base station, one set of ePDCCH resource regions of the terminal in a current subframe from the plurality sets of candidate ePDCCH resource regions according to at least one of the following parameters; and
    transmitting, by the base station, control signaling to the terminal on some or all of the resources in the determined one set of the ePDCCH resource regions;
    so that, after the terminal receives the control signaling transmitted by the base station, the terminal detects the received control signaling in the same set of ePDCCH resource regions which is selected from the received one set of candidate ePDCCH resource regions and the determined one or more other sets of candidate ePDCCH resource regions by the terminal according to the same parameter(s); and
    wherein, the parameters include: a number of Resource Elements (REs) available for carrying control information in a resource block in the current subframe; a number of REs available for carrying control information in an enhanced Control Channel Element (eCCE) in the current subframe; a number of REs available for carrying control information in an enhanced Resource Element Group (eREG) in the current subframe; an aggregation level configuration needed to be detected by the terminal; a type of an ePDCCH transmission mode for transmitting the control signaling to the terminal, comprising: a single beamforming transmission mode, a spatial diversity transmission mode, a centralized transmission mode, a distributed transmission mode; a subframe type of the current subframe; a pilot transmission condition in the current subframe; a synchronization signal transmission condition in the current subframe; a Physical Broadcast Channel (PBCH) transmission condition in the current subframe; and a subframe number of the current subframe.

2. The transmission method according to claim 1, wherein, the step of determining, by a base station, one set of ePDCCH resource region of the terminal in a current subframe from the plurality sets of candidate ePDCCH resource regions according to at least one of the parameters comprises:
    determining, by the base station, one set of ePDCCH resource region of the terminal in the current subframe from the plurality sets of candidate ePDCCH resource regions according to at least two of the parameters.

3. The transmission method according to claim 2, wherein, the at least two of the parameters comprise the subframe number of the current subframe.

4. The transmission method according to claim 1, wherein, the subframe type of the current subframe at least comprises one of the following types:
a Time Division Multiplexing (TDD) special subframe type, a non-TDD special subframe type, a cyclic prefix type, a multicast broadcast single frequency network subframe type, a non-multicast broadcast single frequency network subframe type.

5. The transmission method according to claim 1, wherein, the pilot transmission condition in the current subframe at least comprises one of the following conditions:
an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

6. The transmission method according to claim 1, wherein, there are overlapped resources in the plurality sets of candidate ePDCCH resource regions;
when there are two sets of candidate ePDCCH resource regions, the two sets of candidate ePDCCH resource regions are in a subset relationship; and
when there are three sets of candidate ePDCCH resource regions, an union set of a third set of candidate ePDCCH resource region and a second set of candidate ePDCCH resource region is equal to a first set of candidate ePDCCH resource region.

7. A base station, comprising a processor and a storage device, wherein the storage device stores processor-executable programs, and the programs comprise an enhanced Physical Downlink Control Channel (ePDCCH) resource region determination module and a transmission module, wherein,
the ePDCCH resource region determination module is configured to:
determine a plurality sets of candidate ePDCCH resource regions,
notify one set of candidate ePDCCH resource regions and a preset rule to the terminal, to make the terminal determine one or more other sets of candidate ePDCCH resource regions according to the notified set of candidate ePDCCH resource regions and the preset rule, wherein the determined one or more other sets of candidate ePDCCH resource regions and the notified set of candidate ePDCCH resource regions in the terminal are the same with the plurality sets of candidate ePDCCH resource regions in the base station, and
determine one set of ePDCCH resource regions of the terminal in a current subframe from the plurality sets of candidate ePDCCH resource regions according to at least one of the following parameters; and
the transmission module is configured to transmit control signaling to the terminal on some or all of the resources in the determined one set of the ePDCCH resource regions;
so that, after the terminal receives the control signaling transmitted by the base station, the terminal detects the received control signaling in the same set of ePDCCH resource regions which is selected from the received one set of candidate ePDCCH resource regions and the determined one or more other sets of candidate ePDCCH resource regions by the terminal according to the same parameter(s), and wherein, the parameters include: a number of Resource Elements (REs) available for carrying control information in a resource block in the current subframe; a number of REs available for carrying control information in an enhanced Control Channel Element (eCCE) in the current subframe; a number of REs available for carrying control information in an enhanced Resource Element Group (eREG) in the current subframe; an aggregation level configuration needed to be detected by the terminal; a type of an ePDCCH transmission mode for transmitting the control signaling to the terminal, comprising: a single beamforming transmission mode, a spatial diversity transmission mode, a centralized transmission mode, a distributed transmission mode; a subframe type of the current subframe; a pilot transmission condition in the current subframe; a synchronization signal transmission condition in the current subframe; a Physical Broadcast Channel (PBCH) transmission condition in the current subframe; and a subframe number of the current subframe.

8. The base station according to claim 7, wherein, the ePDCCH resource region determination module is configured to determine one set of ePDCCH resource region of the terminal in a current subframe from the plurality sets of candidate ePDCCH resource regions by means of:
determining one set of ePDCCH resource region of the terminal in the current subframe from the plurality sets of candidate ePDCCH resource regions according to at least two of the parameters;
wherein, the at least two of the parameters comprise the subframe number of the current subframe.

9. A control signaling detection method, wherein,
receiving, by a terminal, one set of candidate ePDCCH resource regions and a preset rule from a base station, and determining one or more other sets of candidate ePDCCH resource regions according to the received set of candidate ePDCCH resource regions and the preset rule, wherein the determined one or more other sets of candidate ePDCCH resource regions and the received set of candidate ePDCCH resource regions in the terminal are the same with a plurality sets of candidate ePDCCH resource regions in the base station;
determining, by the terminal, one set of ePDCCH resource regions of the terminal in a current subframe from the plurality sets of candidate ePDCCH resource regions according to at least one of the following parameters; and
detecting, by the terminal, control signaling on some or all of the resources in the determined one set of ePDCCH resource regions which is same as a set of ePDCCH resource region determined by the base station according to the same parameter(s);
wherein, the parameters include: a number of Resource Elements (REs) available for carrying control information in a resource block in the current subframe; a number of REs available for carrying control information in an enhanced Control Channel Element (eCCE) in the current subframe; a number of REs available for carrying control information in an enhanced Resource Element Group (eREG) in the current subframe; an aggregation level configuration needed to be detected by the terminal; a type of an ePDCCH transmission mode for transmitting the control signaling to the terminal, comprising: a single beamforming transmission mode, a spatial diversity transmission mode, a centralized transmission mode, a distributed transmission mode; a subframe type of the current subframe; a pilot transmission condition in the current subframe; a synchronization signal transmission condition in the current subframe; a Physical Broadcast Channel (PBCH) transmission condition in the current subframe; and a subframe number of the current subframe.

10. The detection method according to claim 9, wherein, the step of determining, by the terminal, one set of ePDCCH resource region of the terminal in a current subframe from the plurality sets of candidate ePDCCH resource regions according to at least one of the parameters comprises:

determining, by the terminal, one set of ePDCCH resource region of the terminal in the current subframe from the plurality sets of candidate ePDCCH resource regions according to at least two of the parameters.

11. The detection method according to claim 10, wherein, the at least two of the parameters comprise the subframe number of the current subframe.

12. The detection method according to claim 9, wherein, the resource block is a physical resource block pair or a virtual resource block.

13. The detection method according to claim 9, wherein, the subframe type of the current subframe at least comprises one of the following types:

a Time Division Multiplexing (TDD) special subframe type, a non-TDD special subframe type, a cyclic prefix type, a multicast broadcast single frequency network subframe type, a non-multicast broadcast single frequency network subframe type.

14. The detection method according to claim 9, wherein, the pilot transmission condition in the current subframe at least comprises one of the following conditions:

an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

15. The detection method according to claim 9, wherein, there are overlapped resources in the plurality sets of candidate ePDCCH resource regions;

when there are two sets of candidate ePDCCH resource regions, the two sets of candidate ePDCCH resource regions are in a subset relationship; and when there are three sets of candidate ePDCCH resource regions, an union set of a third set of candidate ePDCCH resource region and a second set of candidate ePDCCH resource region is equal to a first set of candidate ePDCCH resource region.

16. A terminal, comprising a processor and a storage device, wherein the storage device stores processor-executable programs, and the programs comprise an enhanced Physical Downlink Control Channel (ePDCCH) resource region determination module and a detection module, wherein, the ePDCCH resource region determination module is configured to:

receive one set of candidate ePDCCH resource regions and a preset rule from a base station, and determine one or more other sets of candidate ePDCCH resource regions according to the received set of candidate ePDCCH resource regions and the preset rule, wherein the determined one or more other sets of candidate ePDCCH resource regions and the received set of candidate ePDCCH resource regions in the terminal are the same with a plurality sets of candidate ePDCCH resource regions in the base station;

determine one set of ePDCCH resource regions of the terminal in a current subframe from the plurality sets of candidate ePDCCH resource regions according to at least one of the following parameters; and the detection module is configured to detect control signaling on some or all of the resources in the determined one set of ePDCCH resource regions which is same as a set of ePDCCH resource region determined by the base station according to the same parameter(s);

wherein, the parameters include: a number of Resource Elements (REs) available for carrying control information in a resource block in the current subframe; a number of REs available for carrying control information in an enhanced Control Channel Element (eCCE) in the current subframe; a number of REs available for carrying control information in an enhanced Resource Element Group (eREG) in the current subframe; an aggregation level configuration needed to be detected by the terminal; a type of an ePDCCH transmission mode for transmitting the control signaling to the terminal, comprising: a single beamforming transmission mode, a spatial diversity transmission mode, a centralized transmission mode, a distributed transmission mode; a subframe type of the current subframe; a pilot transmission condition in the current subframe; a synchronization signal transmission condition in the current subframe; a Physical Broadcast Channel (PBCH) transmission condition in the current subframe; and a subframe number of the current subframe.

17. The terminal according to claim 16, wherein, the ePDCCH resource region determination module is configured to determine one set of ePDCCH resource region of the terminal in a current subframe from the plurality sets of candidate ePDCCH resource regions by means of:

determining one set of ePDCCH resource region of the terminal in the current subframe from the plurality sets of candidate ePDCCH resource regions according to at least two of the parameters.

18. The terminal according to claim 17, wherein, the at least two of the parameters comprise the subframe number of the current subframe.

19. The terminal according to claim 16, wherein, the resource block is a physical resource block pair or a virtual resource block, or, wherein, the subframe type of the current subframe at least comprises one of the following types:

a Time Division Multiplexing (TDD) special subframe type, a non-TDD special subframe type, a cyclic prefix type, a multicast broadcast single frequency network subframe type, a non-multicast broadcast single frequency network subframe type, or, wherein, the pilot transmission condition in the current subframe at least comprises one of the following conditions:

an overhead size of a Common Reference Signal (CRS) in the current subframe, an overhead size of a Channel State Information Reference Signal (CSI-RS) in the current subframe, and an overhead size of a Positioning Reference Signal (PRS) in the current subframe.

20. The terminal according to claim 16, wherein, there are overlapped resources in the plurality sets of candidate ePDCCH resource regions;

when there are two sets of candidate ePDCCH resource regions, the two sets of candidate ePDCCH resource regions are in a subset relationship; and when there are three sets of candidate ePDCCH resource regions, an union set of a third set of candidate ePDCCH resource region and a second set of candidate ePDCCH resource region is equal to a first set of candidate ePDCCH resource region.

* * * * *